(12) United States Patent
Matsumoto et al.

(10) Patent No.: US 10,672,419 B1
(45) Date of Patent: Jun. 2, 2020

(54) MAGNETIC RECORDING AND READING APPARATUS AND MAGNETIC RECORDING METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventors: Takuya Matsumoto, Tokyo (JP); Akihiko Takeo, Kokubunji Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/455,919

(22) Filed: Jun. 28, 2019

(30) Foreign Application Priority Data

Nov. 30, 2018 (JP) .................. 2018-225837

(51) Int. Cl.
*G11B 5/54* (2006.01)
*G11B 5/012* (2006.01)
*G11B 5/60* (2006.01)

(52) U.S. Cl.
CPC ............ *G11B 5/012* (2013.01); *G11B 5/6011* (2013.01); *G11B 5/6082* (2013.01)

(58) Field of Classification Search
CPC .... G11B 5/54; G11B 5/00; G11B 5/09; G11B 11/10; G11B 11/105; G11B 2005/0021; G11B 2005/3996

USPC ............................................. 360/59, 75, 324
See application file for complete search history.

(56) References Cited

U.S. PATENT DOCUMENTS

| 7,092,218 | B2 * | 8/2006 | Hasegawa .............. B82Y 10/00 360/321 |
| 8,773,801 | B2 | 7/2014 | Kurita et al. |
| 8,896,947 | B2 | 11/2014 | Koizumi et al. |
| 9,355,668 | B2 | 5/2016 | Nishida et al. |
| 2013/0050865 | A1 | 2/2013 | Katada et al. |

FOREIGN PATENT DOCUMENTS

| JP | 5106667 B1 | 12/2012 |
| JP | 2014-120190 A | 6/2014 |
| JP | 2014-229339 A | 12/2014 |

* cited by examiner

*Primary Examiner* — Nabil Z Hindi
(74) *Attorney, Agent, or Firm* — White & Case LLP

(57) ABSTRACT

According to one embodiment, a magnetic recording and reading apparatus has a magnetic head and a system controlling a flying height of the magnetic head. The system includes a main control unit, a resistance measurement unit which measures a resistance value of a magnetic flux control layer, a calculation unit which obtains a resistance value change rate with respect to an initial resistance value, a determination unit which determines a flying height for recording corresponding to the resistance value change rate, and a flying height control unit which controls a flying height of the magnetic head.

20 Claims, 19 Drawing Sheets

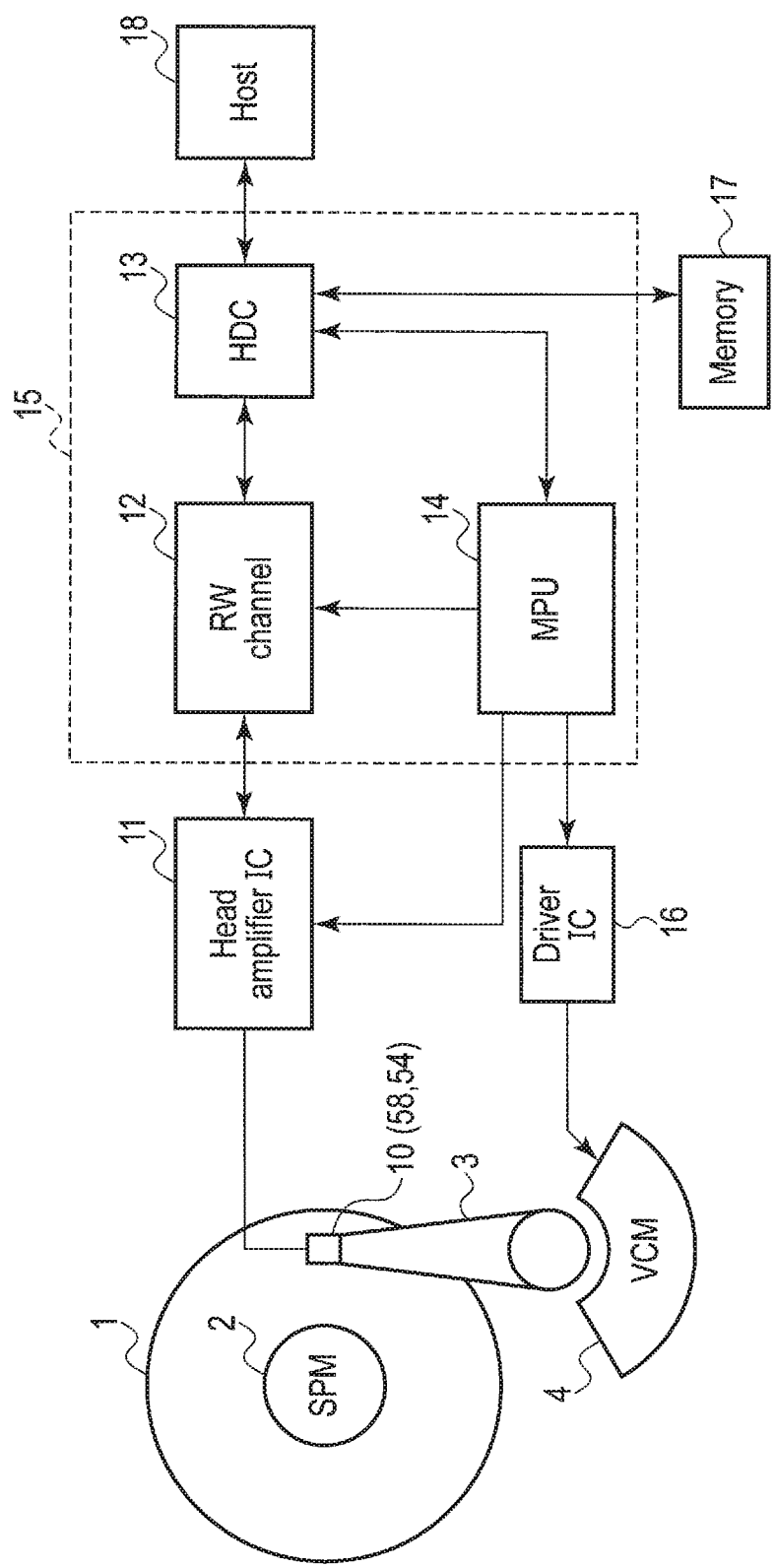
F I G. 1

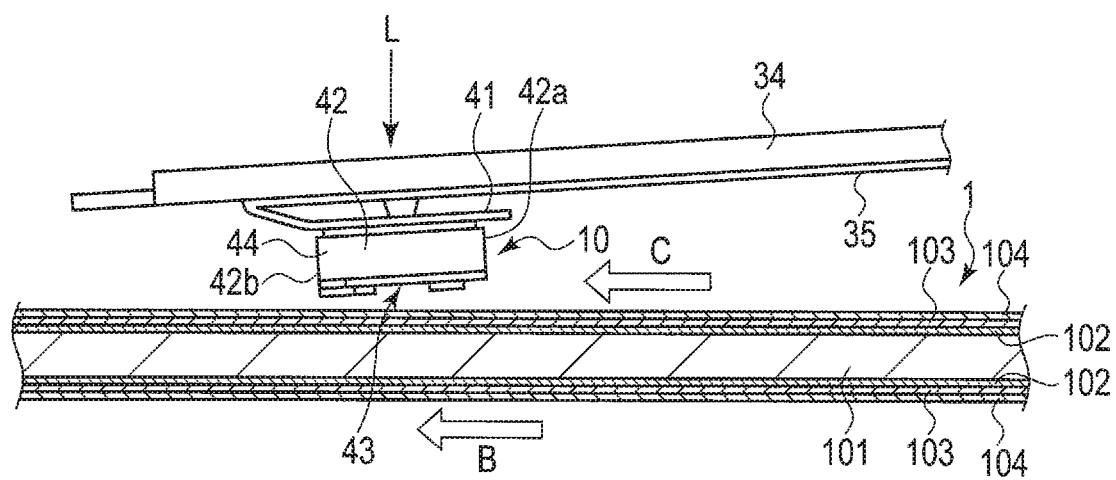
F I G. 2

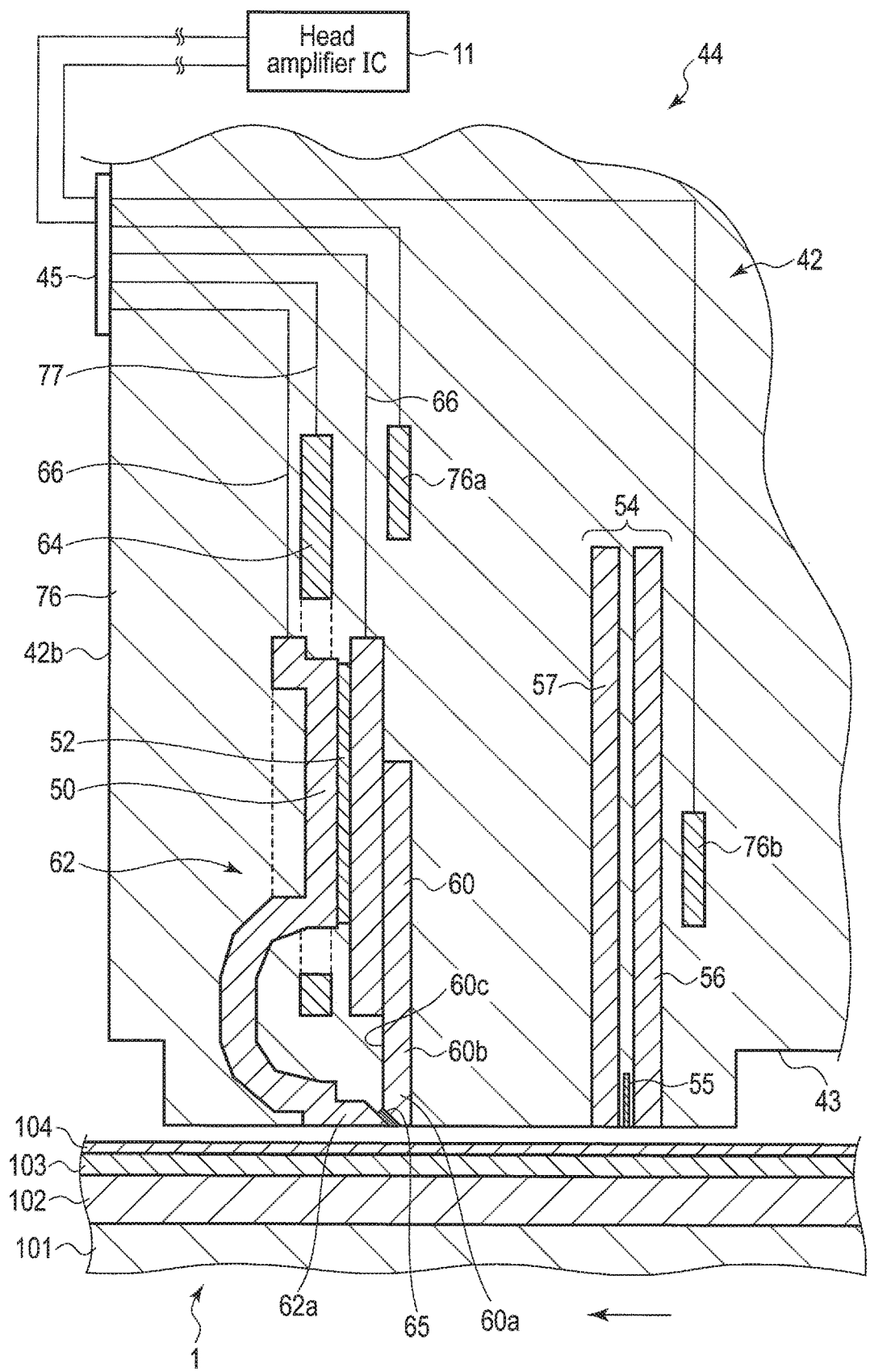
F I G. 3

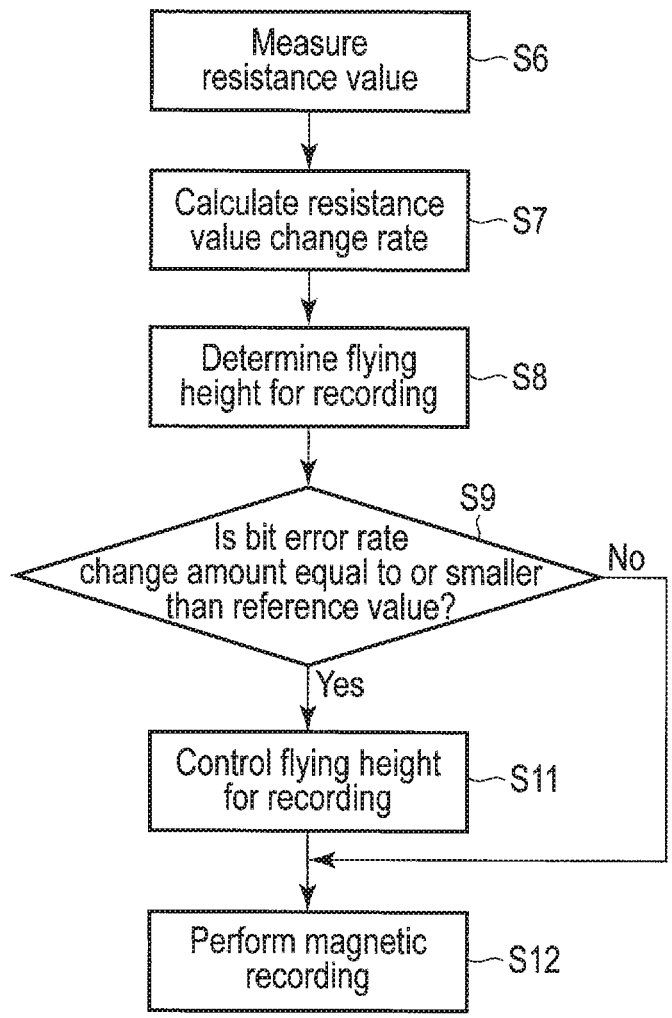
F I G. 16

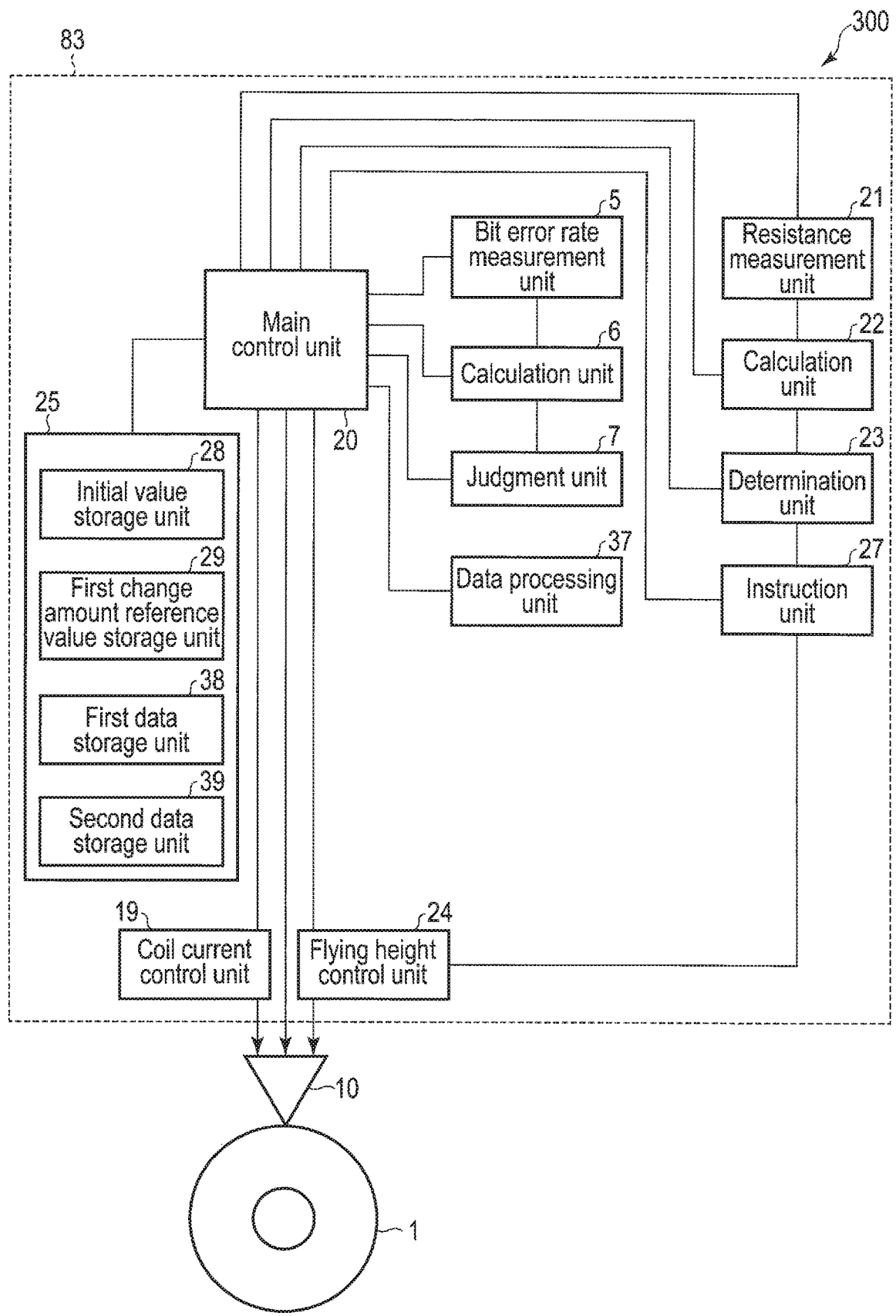
F I G. 17

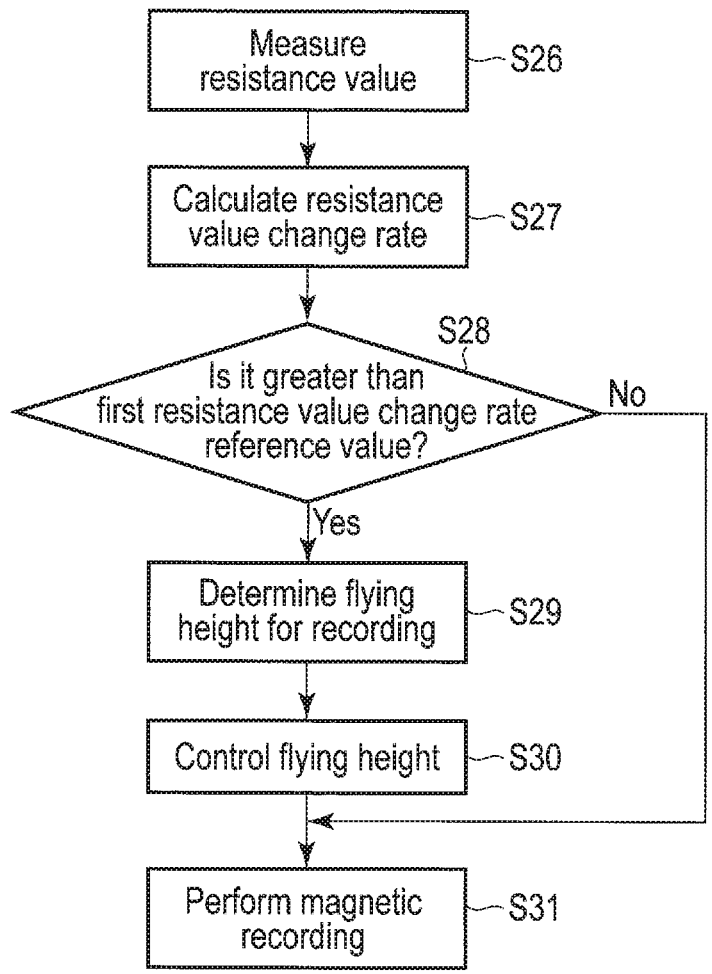
F I G. 20

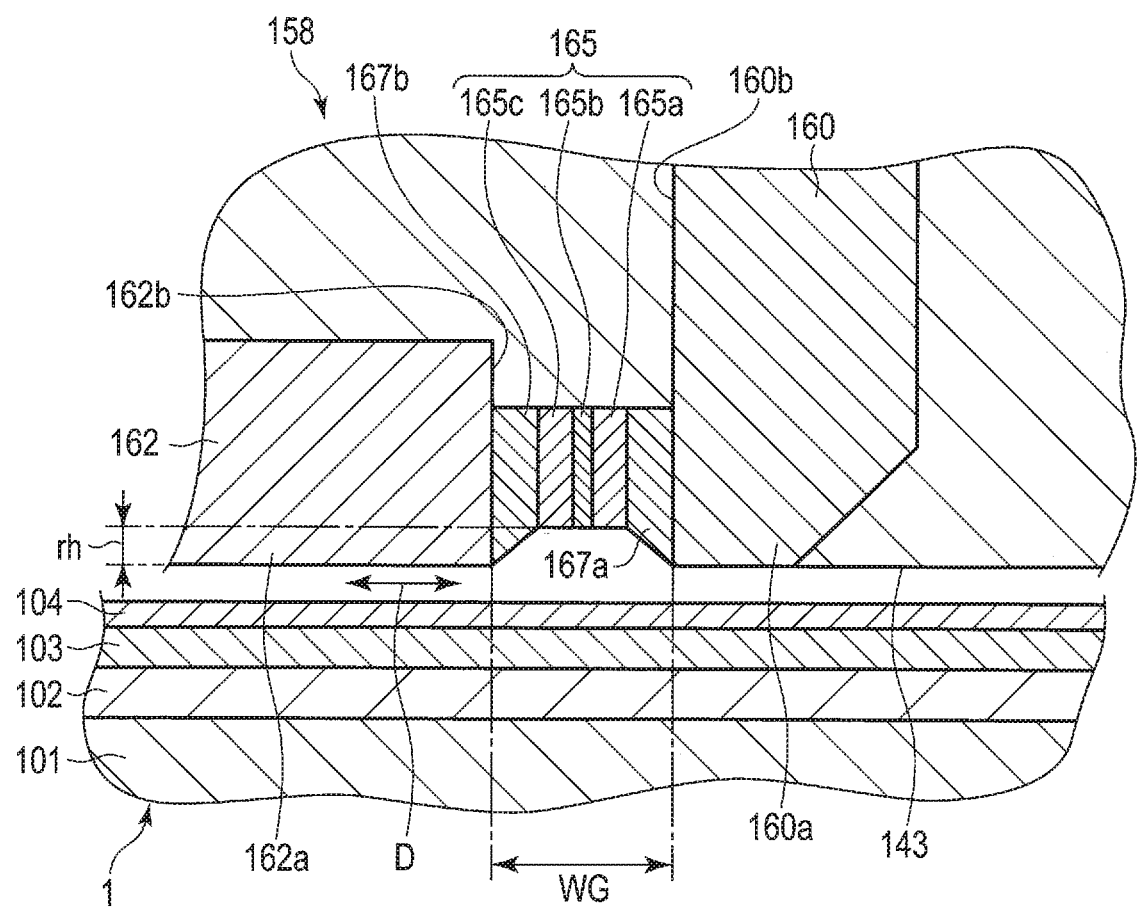
F I G. 23

MAGNETIC RECORDING AND READING APPARATUS AND MAGNETIC RECORDING METHOD

CROSS-REFERENCE TO RELATED APPLICATIONS

This application is based upon and claims the benefit of priority from Japanese Patent Application No. 2018-225837, filed Nov. 30, 2018, the entire contents of which are incorporated herein by reference.

FIELD

Embodiments described herein relate generally to a magnetic recording and reading apparatus and a magnetic recording method.

BACKGROUND

A magnetic flux control layer has a laminated structure made of a magnetic material and a nonmagnetic material, and is disposed between a main magnetic pole and an auxiliary magnetic pole of a magnetic head. An electrical insulating layer is disposed at a junction between the main magnetic pole and the auxiliary magnetic pole, and these mutually insulated portions are electrically connected to driving terminal electrodes. As a result, the main magnetic pole and the auxiliary magnetic pole function as electrodes for vertically conducting the magnetic flux control layer. When the magnetic flux control layer is conducted, a spin torque acts on the magnetic flux control layer, and a record magnetic field applied from the main magnetic pole to a recording layer of a magnetic disk is increased. (Assist effect)

On the other hand, the magnetic flux control layer generates heat by the conduction, and therefore, magnetic elements of the magnetic flux control layer may be combined with oxygen atoms remaining in the magnetic recording and reading apparatus to form an oxide depending on the temperature. The oxidized magnetic flux control layer not only reduces an assist effect but also increases a volume as oxidation is progressed, such that spacing between the magnetic head and the magnetic disk is reduced and a risk of contact between the magnetic head and the magnetic disk is increased.

BRIEF DESCRIPTION OF THE DRAWINGS

FIG. 1 is a block diagram for describing a configuration of a disk drive according to a first embodiment.

FIG. 2 is a side view illustrating a magnetic head and a suspension in the HDD.

FIG. 3 is an enlarged cross-sectional view of a head unit of the magnetic head.

FIG. 16 is a flow chart illustrating an operation of the system used for the disk drive according to the second embodiment.

FIG. 17 is a flow chart illustrating a functional configuration of a system used for a disk drive according to a third embodiment.

FIG. 20 is a flow chart illustrating an operation of the system for controlling a flying height of the magnetic head used for the disk drive according to the fourth embodiment.

FIG. 23 is an enlarged cross-sectional view of an ABS side end portion of a recording head, which is used for a disk drive according to a sixth embodiment, taken along a track center.

DETAILED DESCRIPTION

Figure 4:
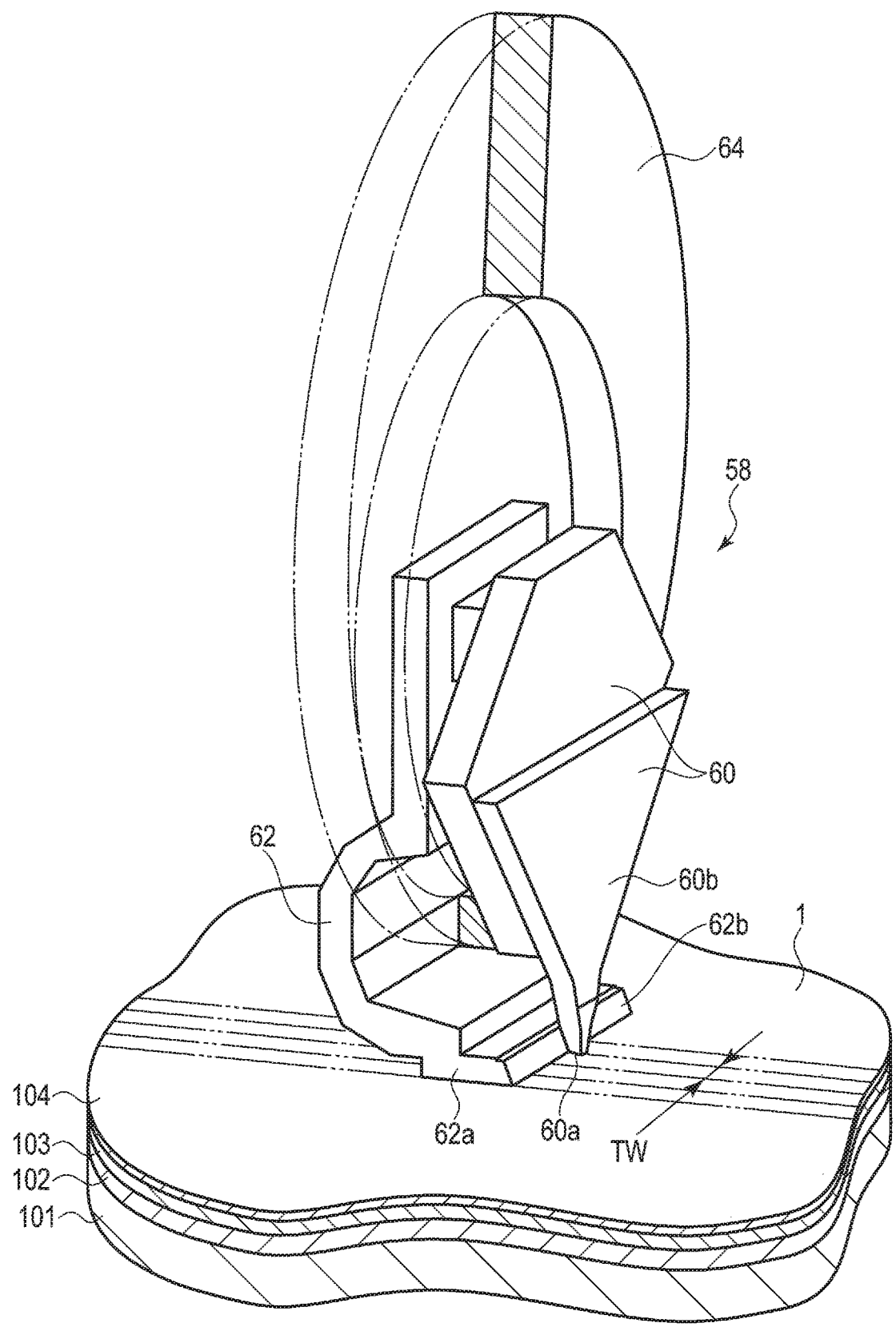
FIG. 4 is a perspective view schematically illustrating a recording head of the magnetic head.

A disk apparatus as a magnetic recording and reading apparatus according to an embodiment will be described below with reference to the drawings.

In general, according to one embodiment, a magnetic recording and reading apparatus comprises a rotatable disk-shaped recording medium which comprises a magnetic recording layer, a magnetic head which records information on the recording medium, and a system which controls a flying height of the magnetic head.

The magnetic head comprises an air bearing surface, a main magnetic pole which comprises a tip portion extending up to the air bearing surface and generates a recording magnetic field in a vertical direction, an auxiliary magnetic pole which faces the tip portion of the main magnetic pole at a write gap and configures a magnetic core along with the main magnetic pole, a coil which magnetizes the main magnetic pole and the auxiliary magnetic pole, a magnetic flux control layer which comprises a first conductive layer provided on the main magnetic pole, an adjustment layer laminated on the first conductive layer, and made of a magnetic material including at least one of iron, cobalt, or nickel, and a second conductive layer electrically connecting between the adjustment layer and the auxiliary magnetic pole, and a protective layer which is provided on the main magnetic pole, the magnetic flux control layer, and the air bearing surface of the auxiliary magnetic pole.

The system which controls the flying height of the magnetic head comprises a main control unit which controls a recording/reading operation of the magnetic head, a storage unit which comprises an initial storage unit storing an initial resistance value of the magnetic flux control layer at an initial use of the magnetic head, a resistance measurement unit which measures a resistance value of the magnetic flux control layer, a calculation unit which acquires the initial resistance value from the initial value storage unit and calculates a ratio of the resistance value of the magnetic flux control layer with respect to the initial resistance value as a resistance value change rate, a determination unit which determines a flying height for recording corresponding to the resistance value change rate, and a flying height control unit which receives the information on the flying height for recording to control the flying height of the magnetic head.

The disclosure is merely an example, and appropriate modifications which can be easily conceived by those skilled in the art without departing from the spirit of the invention are naturally included in the scope of the present invention. In addition, a width, a thickness, a shape, and the like of each portion can be schematically illustrated in the drawings in comparison with the actual aspect in order to clarify the description, but these are merely an example, and the interpretation of the present invention is not limited thereto. In addition, in the specification and each drawing, the same elements as those described above with reference to the drawings already described may be denoted by the same reference numerals, and the detailed description thereof may be appropriately omitted.

First Embodiment

First, a configuration of a disk drive according to the present embodiment will be described with reference to FIG. 1. The configuration of the disk drive which is a magnetic recording and reading apparatus illustrated in FIG. 1 is also applied to each of second to sixth embodiments described later.

As shown in FIG. 1, a disk drive is a magnetic disk apparatus of a perpendicular magnetic recording system in which a magnetic disk 1 (hereinafter, simply described as a disk) which is a perpendicular magnetic recording medium and a magnetic head 10 having a magnetic flux control layer to be described later are incorporated.

The disk 1 is fixed to a spindle motor (SPM) 2 and attached to rotate. The magnetic head 10 is mounted on an actuator 3 and configured to move in a radial direction on the disk 1. The actuator 3 is rotationally driven by a voice coil motor (VCM) 4. The magnetic head 10 has a recording (write) head 58 and a reproducing (read) head 54.

In addition, the disk drive includes a head amplifier integrated circuit (hereinafter, referred to as a head amplifier IC) 11, a read/write channel (R/W channel) 12, a hard disk controller (HDC) 13, a microprocessor (MPU) 14, a driver IC 16, and a memory 17. The R/W channel 12, the HDC 13, and the MPU 14 are incorporated in a controller 15 which is constituted by an integrated circuit of one chip.

As described later, the head amplifier IC 11 includes a circuit group for driving a spin-torque oscillator (STO) which is a magnetic flux control layer. Hereinafter, the spin torque oscillator is referred to as the STO. In addition, the head amplifier IC 11 includes a driver which supplies a recording signal (write current) corresponding to a write data supplied from the R/W channel 12 to the recording head 58. In addition, the head amplifier IC 11 includes a read amplifier that amplifies the read signal output from the read head 54 and transmits the amplified read signal to the R/W channel 12.

The R/W channel 12 is a signal processing circuit for the read/write data. The HDC 13 configures an interface between the disk drive and a host 18 and executes a transfer control of the read/write data.

The MPU 14 is a main control unit of the disk drive, and executes a servo control necessary for a control of the read/recording operation and positioning of the magnetic head 10. In addition, the MPU 14 executes a conduction control of the STO according to the first embodiment. The memory 17 includes a buffer memory constituted by a DRAM, a flash memory, and the like.

FIG. 2 is a side view illustrating the magnetic head 10 and a suspension.

As shown in FIG. 2, each magnetic head 10 is configured as a flying head, and has a slider 42 having a substantially rectangular parallelepiped shape and a head unit 44 for a recording and reading provided at an outflow end (trailing end) of the slider 42. The magnetic head 10 is fixed to a gimbal spring 41 provided at a tip portion of a suspension 34. Each magnetic head 10 is applied with a head load L toward a surface of the magnetic disk 1 by elasticity of the suspension 34. As shown in FIG. 2, each magnetic head 10 is connected to the head amplifier IC 11 and the HDC 13 via a wiring member (flexure) 35 fixed on the suspension 34 and an arm 32.

Next, the configurations of the magnetic disk 1 and the magnetic head 10 will be described in detail.

FIG. 3 is an enlarged cross-sectional view of the head unit 44 of the magnetic head 10 and the magnetic disk 1.

As shown in FIGS. 2 and 3, the magnetic disk 1 has, for example, a substrate 101 made of a nonmagnetic material and formed in a disk shape having a diameter of about 2.5 inches (6.35 cm). A soft magnetic layer 102 made of a material exhibiting soft magnetic properties as an underlayer, a magnetic recording layer 103 having magnetic anisotropy in a direction perpendicular to the disk surface, and a protective layer 104 on the magnetic recording layer 103 are sequentially laminated on each surface of the substrate 101.

The slider 42 of the magnetic head 10 is formed of, for example, a sintered body (altic) of alumina and titanium carbide, and the head unit 44 is formed by laminating thin films. The slider 42 has a rectangular disk facing surface (air bearing surface (ABS)) 43 facing the surface of the magnetic disk 1. The slider 42 is floated by an airflow C generated between the surface of the disk and the ABS 43 by the rotation of the magnetic disk 1. A direction of the airflow C coincides with a rotation direction B of the magnetic disk 1. The slider 42 is disposed so that a longitudinal direction of the ABS 43 substantially coincides with the direction of the airflow C with respect to the surface of the magnetic disk 1.

The slider 42 has a leading end 42a located on an inflow side of the airflow C and a trailing end 42b located on an outflow side of the airflow C. The ABS 43 of the slider 42 is provided with a leading step, a trailing step, a side step, a negative pressure cavity and the like, which are not illustrated.

As shown in FIG. 3, the head unit 44 has a read head 54 and a recording head (magnetic recording head) 58 formed at the trailing end 42b of the slider 42 by a thin film process, and is formed as a separate type magnetic head. The read head 54 and the recording head 58 are covered with a protective insulating film 76 except for the portion exposed to the ABS 43 of the slider 42. The protective insulating film 76 constitutes an appearance of the head unit 44.

The read head 54 is constituted by a magnetic film 55 exhibiting a magnetoresistance effect, and shield films 56 and 57 disposed on the trailing side and a leading side of the magnetic film 55 so as to have the magnetic film 55 interposed therebetween. Lower ends of the magnetic film 55 and the shield films 56 and 57 are exposed to the ABS 43 of the slider 42. The recording head 58 is provided on the trailing end 42b side of the slider 42 with respect to the read head 54.

Figure 5:
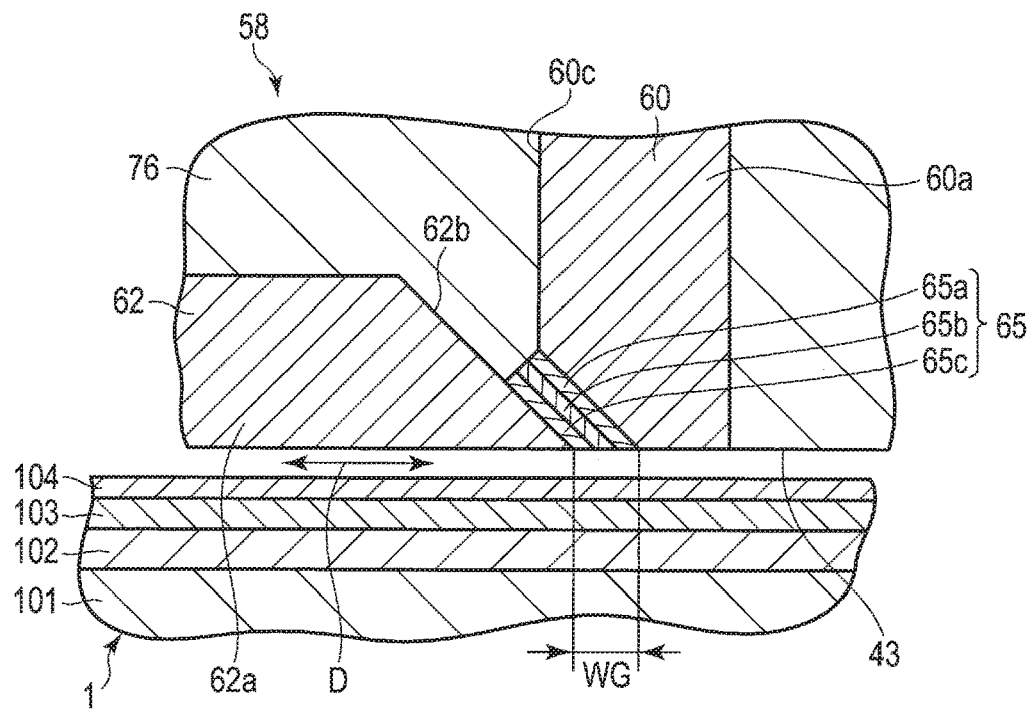
FIG. 5 is an enlarged cross-sectional view of an ABS side end portion of the recording head taken along a track center.
Figure 6:
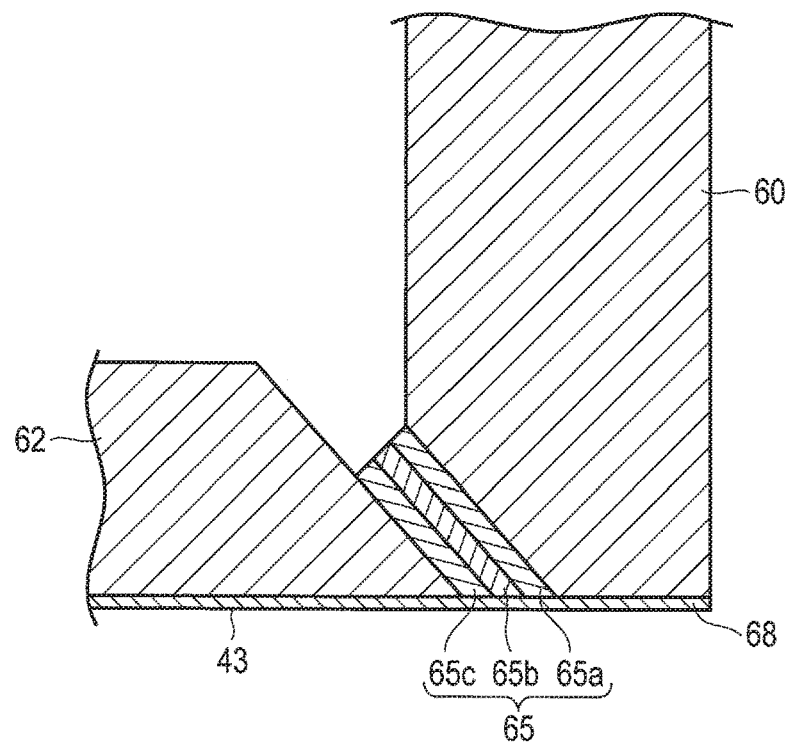
FIG. 6 is an enlarged cross-sectional view illustrating a part of the magnetic head of FIG. 5.

FIG. 4 is a perspective view schematically illustrating the recording head 58 and the magnetic disk 1, and FIG. 5 is an enlarged cross-sectional view of an end of the recording head 58 on the magnetic disk 1 side taken along a track center. FIG. 6 is an enlarged cross-sectional view of a part of the recording head 58 of FIG. 5.

As shown in FIGS. 3 to 5, the recording head 58 has a main magnetic pole 60 made of a high saturation magnetization material that generates a recoding magnetic field in a perpendicular direction with respect to the surface of the magnetic disk 1, a trailing shield (auxiliary magnetic pole) 62 which is disposed on the trailing side of the main magnetic pole 60 and is made of a soft magnetic material provided to effectively close a magnetic path via the soft magnetic layer 102 just below the main magnetic pole 60, a recording coil 64 which is disposed to be wound around a magnetic core (magnetic circuit) including the main magnetic pole 60 and the trailing shield 62 in order to flow a magnetic flux into the main magnetic pole 60 at the time of recording a signal onto the magnetic disk 1, and a magnetic flux control layer 65 which is disposed between a tip portion 60a of the main magnetic pole 60 on the ABS 43 side and the trailing shield 62 and is disposed to flush with the ABS 43.

The main magnetic pole 60 made of a soft magnetic material extends substantially perpendicularly to the surface of the magnetic disk 1 and the ABS 43. A lower end portion of the main magnetic pole 60 on the ABS 43 side has a narrowed portion 60b which is tapered toward the ABS 43 and narrowed in a track width direction in a funnel shape, and a tip portion 60a having a predetermined width which extends from the narrowed portion 60b to the magnetic disk side. A tip of the tip portion 60a, that is, a lower end thereof is exposed to the ABS 43 of the magnetic head. A width of the tip portion 60a in the track width direction substantially corresponds to a track width TW in the magnetic disk 1. In addition, the main magnetic pole 60 also has a shield side end face 60c which extends substantially perpendicular to the ABS 43 and is directed to the trailing side. In one example, the end portion of the ABS 43 side on the shield side end face 60c obliquely extends to the shield side (trailing side) with respect to the ABS 43.

The trailing shield 62 made of a soft magnetic material is formed substantially in an L shape. The trailing shield 62 has a tip portion 62a which faces the tip portion 60a of the main magnetic pole 60 at a write gap WG, and a connection portion (back gap portion) 50 which is separated from the ABS 43 and connected to the main magnetic pole 60. The connection portion 50 is connected to an upper portion of the main magnetic pole 60, that is, an upper portion away from a back side of the ABS 43 or above the ABS 43 via a nonconductive body 52.

The tip portion 62a of the trailing shield 62 is formed in an elongated rectangular shape. A lower end face of the trailing shield 62 is exposed to the ABS 43 of the slider 42. A leading side end face (main magnetic pole side end face) 62b of the tip portion 62a extends along the track width direction of the magnetic disk 1 and is inclined to the trailing side with respect to the ABS 43. The leading side end face 62b faces the shield side end face 60c of the main magnetic pole 60 substantially in parallel at the write gap WG at the lower end portion of the main magnetic pole 60 (the tip portion 60a and a part of the narrowed portion 60a).

As shown in FIG. 5, the magnetic flux control layer 65 suppresses only the inflow of the magnetic flux from the main magnetic pole 60 into the trailing shield 62, that is, has a function of oscillating a spin torque so that the permeability of the write gap WG becomes effectively negative.

Specifically, the magnetic flux control layer 65 includes an intermediate layer (first nonmagnetic conductive layer) 65a having conductivity, an adjustment layer 65b, and a conductive cap layer (second nonmagnetic conductive layer) 65c having conductivity, and these layers are configured by being sequentially laminated from the main magnetic pole 60 side toward the trailing shield 62 side, that is, sequentially laminated along a traveling direction D of the magnetic head. Each of the intermediate layer 65a, the adjustment layer 65b, and the conductive cap layer 65c has a film surface which extends parallel to the shield side end face 60c of the main magnetic pole 60, that is, in a direction intersecting with the ABS 43.

The laminated direction of the intermediate layer 65a, the adjustment layer 65b, and the conductive cap layer 65c is not limited to the above, and may be laminated in a reverse direction, that is, from the trailing shield 62 side toward the main magnetic pole 60 side.

In addition, As shown in FIG. 6, a protective layer 68 is provided on the ABS 43 of the recording head 58 which includes the main magnetic pole 60, the magnetic flux control layer 65, and the trailing shield 62.

The intermediate layer 65a can be formed of, for example, a metal layer such as Cu, Au, Ag, Al, Ir, and a NiAl alloy, and a material that does not interfere with spin conduction. The intermediate layer 65a is formed directly on the shield side end face 60c of the main magnetic pole 60. The adjustment layer 65b contains a magnetic material containing at least one of iron, cobalt, or nickel. As the adjustment layer, for example, an alloy material in which at least one of Al, Ge, Si, Ga, B, C, Se, Sn, and Ni is added to FeCo, and at least one material selected from an artificial lattice group made of Fe/Co, Fe/Ni, and Co/Ni can be used. A thickness of the adjustment layer can be, for example, 2 to 20 nm. The conductive cap layer 65c can be made of a nonmagnetic metal and a material which blocks the spin conduction. The conductive cap layer 65c can be made of, for example, at least one selected from Ta, Ru, Pt, W, Mo, and Ir, or an alloy containing at least one thereof. The conductive cap layer 65c is formed directly on the leading side end face 62b of the trailing shield 62. In addition, the conductive cap layer can be a single layer or a multilayer.

The intermediate layer 65a is formed to have a film thickness enough to transmit the spin torque from the main magnetic pole 60 and make an exchange interaction sufficiently weak, for example, a film thickness of 1 to 5 nm. The conductive cap layer 65c may have a film thickness enough to block the spin torque from the trailing shield 62 and make an exchange interaction weak, for example, a film thickness of 1 nm or more.

Since the magnetization direction of the adjustment layer 65b needs to be opposite to the magnetic field due to the spin torque from the main magnetic pole 60, the saturation magnetic flux density of the adjustment layer 65b is preferably small. On the other hand, in order to effectively shield the magnetic flux by the adjustment layer 65b, the saturation magnetic flux density of the adjustment layer 65b is preferably large. Since the magnetic field between the write gaps WG is about 10 to 15 kOe, it is difficult to improve the effects even if the saturation magnetic flux density of the adjustment layer 65b is about 1.5 T or more. From the above, the saturation magnetic flux density of the adjustment layer 65b is preferably 1.5 T or less, and more specifically, the product of the film thickness and the saturation magnetic flux density of the adjustment layer 65b is preferably 20 nmT or less.

In order for a current to intensively flow in a direction perpendicular to the film surface of the intermediate layer 65a, the adjustment layer 65b, and the conductive cap layer 65c, the periphery of the magnetic flux control layer 65 is covered with an insulating layer, for example, a protective insulating film 76 except for the part where the magnetic flux control layer 65 is in contact with the main magnetic pole 60 and the trailing shield 62.

The main magnetic pole 60 can be made of a soft magnetic metal alloy containing a Fe—Co alloy as a main component. The main magnetic pole 60 also has a function as an electrode for applying a current to the intermediate layer 65a. The trailing shield 62 can be made of a soft magnetic metal alloy containing a Fe—Co alloy as a main component. The trailing shield 62 also has a function as an electrode for applying a current to the conductive cap layer 65c.

The protective layer 68 is provided to protect the ABS, is made of one or more materials, and is formed of a single layer or a multilayer. The protective layer has, for example, a surface layer made of diamond like carbon.

In addition, it is also possible to provide an underlayer made of, for example, Si or the like between the ABS 43 of the recording head 58 and the protective layer 68.

In addition, the underlayer can be further provided between the main magnetic pole 60 and the intermediate layer 65a.

For the underlayer, for example, a metal such as Ta and Ru can be used. A thickness of the underlayer can be, for example, 0.5 to 10 nm. In addition, the thickness of the underlayer can be about 2 nm.

In addition, a cap layer can be further provided between the trailing shield 62 and the conductive cap layer 65c.

As the cap layer, at least one nonmagnetic element selected from the group consisting of Cu, Ru, W, and Ta can be used. A thickness of the cap layer can be, for example, 0.5 to 10 nm. In addition, the thickness of the underlayer can be about 2 nm.

Besides, CoFe can be used as a spin polarization layer between the main magnetic pole and the intermediate layer.

As shown in FIG. 3, the main magnetic pole 60 and the trailing shield 62 are each connected to a connection terminal 45 through a wiring 66, and are connected to the head amplifier IC 11 and the HDC 13 of FIG. 1 through the wiring member (flexure) 35 of FIG. 2. A current circuit which serially conducts an STO drive current (bias voltage) from the head amplifier IC through the main magnetic pole 60, the STO 65, and the trailing shield 62 is configured.

The recording coil 64 is connected to the connection terminal 45 through the wiring 77 and is further connected to the head amplifier IC 11 through the flexure 35. When a signal is written onto the magnetic disk 12, the main magnetic pole 60 is excited to flow a magnetic flux into the main magnetic pole 60 by supplying a recording current from a recording current supply circuit (not illustrated) of the head amplifier IC 11 to the recording coil 64. The recording current supplied to the recording coil 64 is controlled by the HDC 13.

According to the HDD configured as described above, the actuator 3 is rotationally driven by driving the VCM 4, and the magnetic head 10 moves to and is positioned on a desired track of the magnetic disk 1. In addition, As shown in FIG. 2, magnetic head 10 is floated by the airflow C generated between the surface of the disk and the ABS 43 by the rotation of the magnetic disk 1. During the operation of the HDD, the ABS 43 of the slider 42 faces the disk surface with a gap. In this state, the recording information is read from the magnetic disk 1 by the read head 54, and the read information is written by the recording head 58.

The head unit 44 of the magnetic head can optionally be provided with a first heater 76a and a second heater 76b. The first heater 76a is provided in the vicinity of the recording head 58, for example, in the vicinity of the recording coil 64 and the main magnetic pole 60. The second heater 76b is provided in the vicinity of the read head 54. The first heater 76a and the second heater 76b are each connected to the connection terminal 45 through a wiring, and are further connected to the head amplifier IC 11 through the flexure 35.

The first heater 76a and the second heater 76b are, for example, a coil shape, and generate heat by being conducted to thermally expand the surroundings. As a result, the ABS 43 in the vicinity of the recording head 58 and the read head 54 protrudes, the distance to the magnetic disk 1 approaches, and the flying height of the magnetic head is decreased. As described above, when a driving voltage supplied to the first heater 76a and the second heater 76b, respectively, is adjusted to control the amount of heat generation, it becomes possible to control the flying height of the magnetic head.

Figure 7:
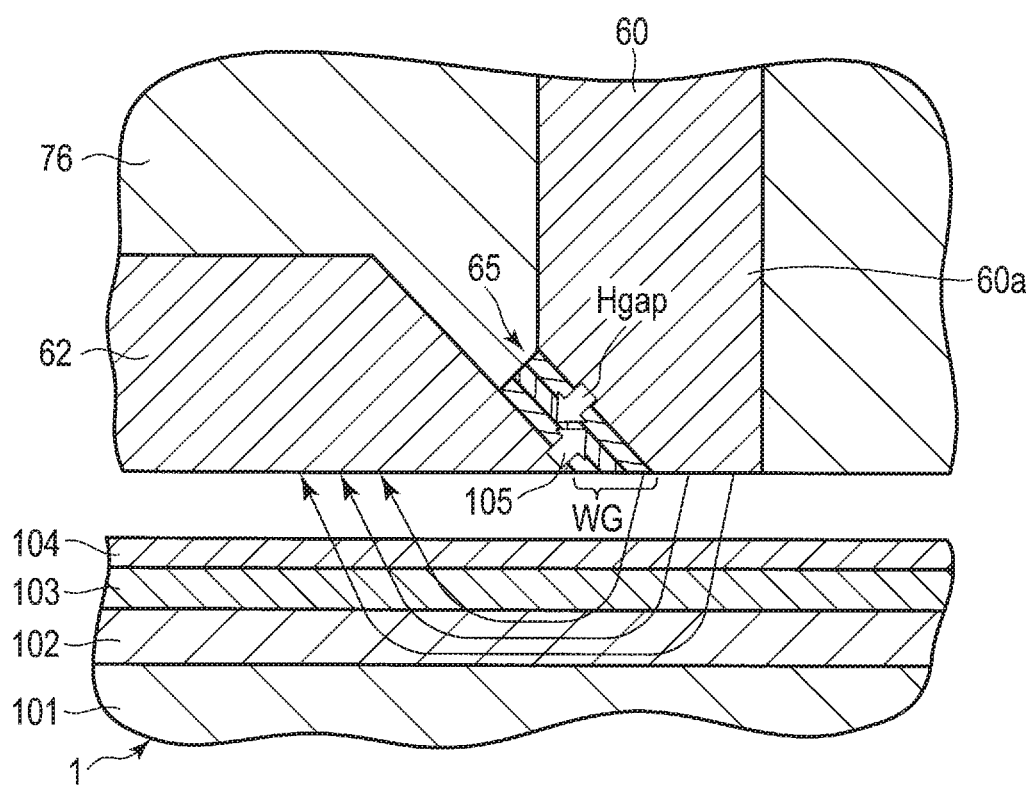
FIG. 7 is a view schematically illustrating a generation magnetic field of the recording head.

FIG. 7 schematically illustrates the magnetization state in the write gap WG in a state in which the magnetic flux control layer 65 is functioning.

In writing the above information, As shown in FIGS. 3 and 7, the main magnetic pole 60 is excited by the recording coil 64 by supplying an alternating current from a power supply 80 to the recording coil 64 to apply a recording magnetic field in a vertical direction to the recording layer 103 of the magnetic disk 1 just below the main magnetic pole 60. Thereby, information is recorded on the magnetic recording layer 103 with a desired track width.

In addition, when the recording magnetic field is applied to the magnetic disk 1, a current is applied from the power supply 74 through the wiring 66, the main magnetic pole 60, the magnetic flux control layer 65, and the trailing shield 62. By applying the current, a spin torque acts on the adjustment layer 65b of the magnetic flux control layer 65 from the main magnetic pole 60, and as shown in an arrow 105, the magnetization direction of the adjustment layer 65b is direction opposite to a direction of a magnetic field (gap magnetic field) Hgap generated between the main magnetic pole 60 and the trailing shield 62. Due to this magnetization reversal, the adjustment layer 65b has an effect of shielding the magnetic flux (gap magnetic field Hgap) flowing directly from the main magnetic pole 60 to the trailing shield 62. As a result, the magnetic field leaking from the main magnetic pole 60 to the write gap WG is decreased, and the convergence of the magnetic flux from the tip portion 60a of the main magnetic pole 60 to the magnetic recording layer 103 of the magnetic disk 1 is increased. Thereby, the resolution of the recording magnetic field can be increased, and a recording linear density can be increased.

The above is a mode in which the magnetization of the magnetic flux control layer is reversed by the action of the spin torque, but may also be a mode in which the magnetization of the magnetic flux control layer are simultaneously rotated. By applying a high frequency magnetic field generated by the simultaneous rotation to the magnetic recording layer 103, the recording linear density can be increased.

According to the first embodiment configured as described above, in the recording head 58, the magnetic flux control layer 65 provided in the write gap WG suppresses the direct flow of the magnetic flux from the main magnetic pole 60 to the trailing shield 62 and effectively acts to make the permeability of the gap negative. Specifically, the magnetic flux control layer 65 is provided between the main magnetic pole 60 and the trailing shield 62, and is configured so that the magnetization direction is opposite to the gap magnetic field by the spin torque. Thereby, the magnetic flux outflowing from the main magnetic pole 60 to the trailing shield 62 can be directed to the magnetic disk (recording medium) 16 while the write gap WG keeps narrow.

On the other hand, the magnetic flux control layer 65 generates heat by being conducted. As a result, the magnetic material of the magnetic flux control layer 65 is oxidized, an oxide is precipitated, and the ABS in the vicinity of the magnetic flux control layer 65 is deformed.

Figure 8:
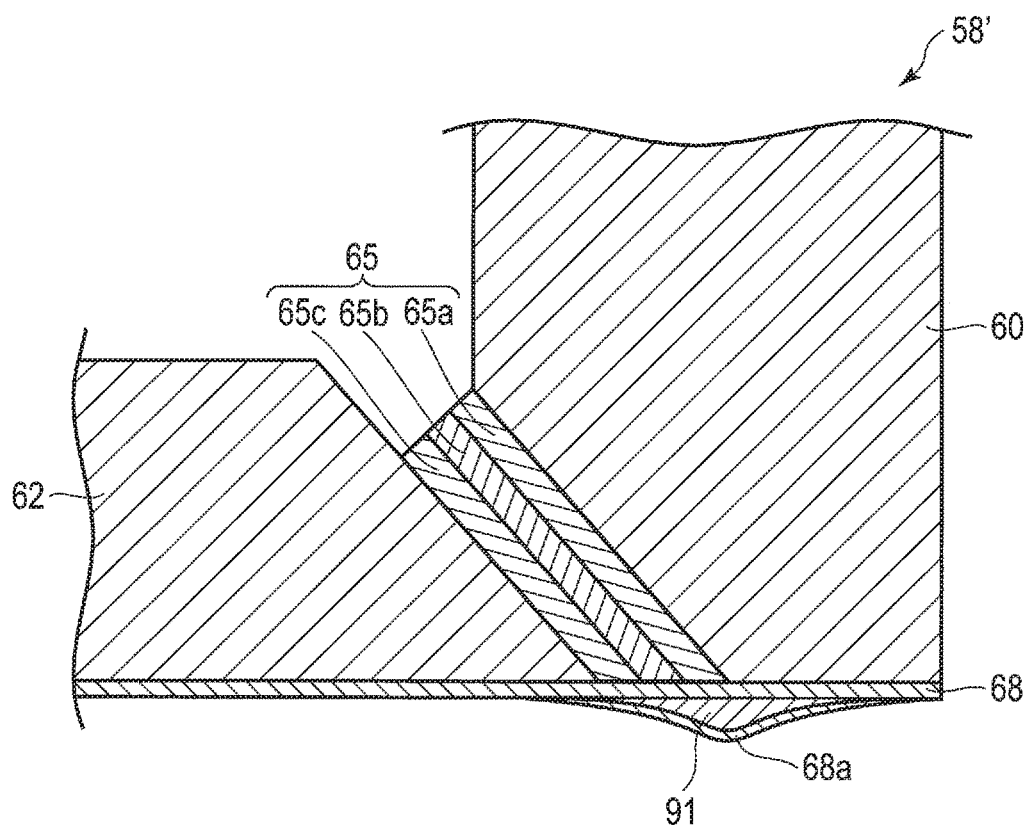
FIG. 8 is a view schematically illustrating a cross section of a magnetic recording head in which the ABS is deformed.

FIG. 8 is a view schematically illustrating a cross section of the magnetic recording head in which the ABS is deformed.

As shown in the recording head 58', an iron oxide layer 91 precipitated in the protective layer 68 due to the oxidation of the magnetic element contained in the magnetic flux control layer 65, for example, iron, pushes up a surface region 68a of the protective layer 68 to cause the deformation. The oxidation of such magnetic materials occurs by the following mechanism.

Figure 9:
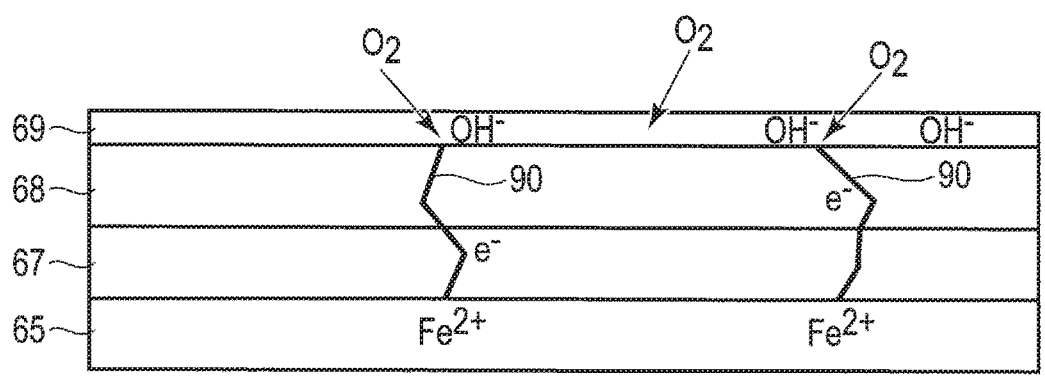
FIG. 9 is a view schematically illustrating an oxidation mechanism of a magnetic flux control layer.

FIG. 9 illustrates a schematic view of the oxidation mechanism of the magnetic flux control layer.

As illustrated, when the protective layer 68 made of diamond like carbon is provided on the ABS of the magnetic flux control layer 65 via, for example, the Si underlayer 67, the surface of the protective layer 68 is provided with a thin film 69 by moisture in the atmosphere. In a general oxidation mechanism, if there is a pin hole 90 in this protective layer 68, oxygen $O_2$ in the HDD is dissolved into the moisture on the surface of the protective layer 68, and electrons $e^-$ reach the magnetic flux control layer 65 through the pin hole 90 and react with iron ions $Fe_2^+$ in the magnetic flux control layer 65 to cause the oxidation reaction of iron.

Examples of the promotion of the oxidation reaction include the case where the amount of oxygen in the HDD as the reaction species is large, the case where iron atoms exceeding the potential energy of the oxidation reaction is increased due to the increase in the temperature during the conduction to the magnetic flux control layer, the case where the thickness of the thin film of the protective layer is thin and thus the number of pin holes is increased, and the like.

As described above, in the magnetic recording medium according to the embodiment, since the magnetic flux control layer is conducted to perform the magnetic recording, even if the spin torque acts on the magnetic flux control layer to obtain the assist effect of increasing the recording magnetic field, the oxide of the magnetic element of the magnetic flux control layer precipitates in the vicinity of the ABS to cause the deformation, so the distance between the magnetic disk and the magnetic head becomes short and the possibility of the contact damage is increased. In addition, a conduction resistance of the magnetic flux control layer is increased by the influence of the oxide.

Figure 10:
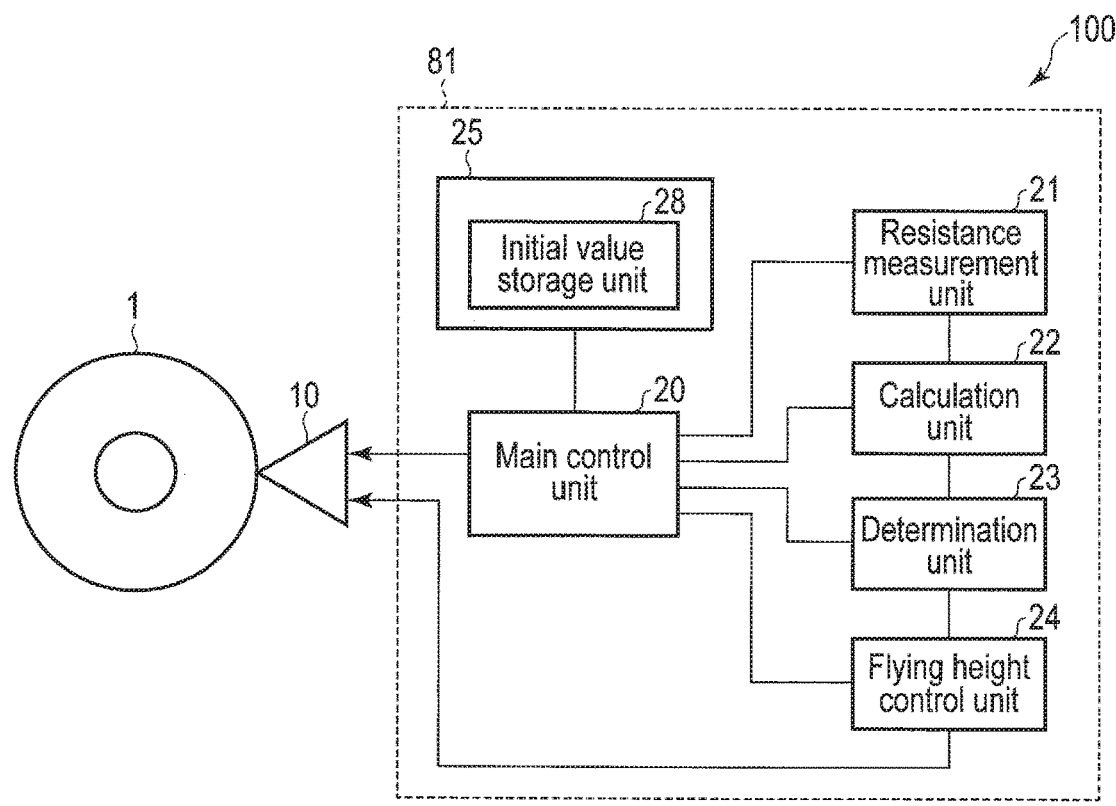
FIG. 10 is a block diagram illustrating a functional configuration of the disk drive according to the first embodiment.

FIG. 10 is a block diagram illustrating a functional configuration of a system for implementing a control of a flying height of a magnetic head in the disk drive according to the first embodiment.

As illustrated, a system 81 used for the disk drive 100 includes a main control unit 20 which is connected to the magnetic head 10 for performing the magnetic recording on the magnetic disk 1 and controls a record/read operation of the magnetic head, a storage unit 25 which includes an initial value storage unit 28 storing an initial resistance value of the magnetic flux control layer at the initial use of the magnetic head, a resistance measurement unit 21 which measures the resistance value of the magnetic flux control layer, a calculation unit 22 which calculates, as the resistance value change rate, a percentage of the resistance value of the magnetic flux control layer with respect to the initial resistance value of the magnetic flux control layer measured at the initial use of the magnetic head, a determination unit 23 which determines the flying height for writing corresponding to the resistance value change rate, and a flying height control unit 24 which receives information on the flying height for writing to control the flying height of the magnetic head.

Figure 11:
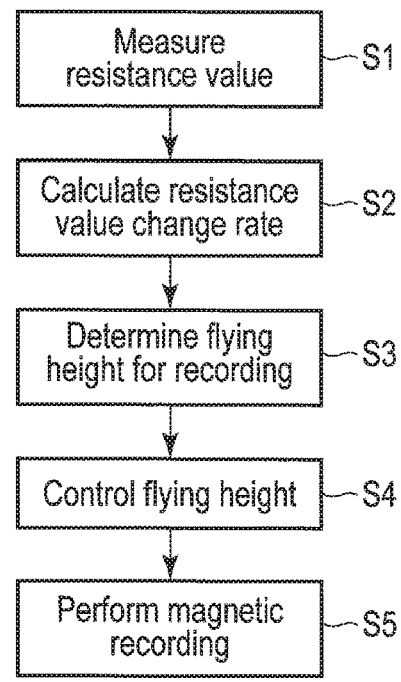
FIG. 11 is a flow chart illustrating an operation of a system used for the disk drive according to the first embodiment.

FIG. 11 is a flowchart illustrating the operation of the system for controlling the flying height of the magnetic head used for the disk drive according to the first embodiment.

As shown in the system 81, first, the resistance measurement unit 21 measures the resistance value of the magnetic flux control layer before writing by the magnetic head (S1). The calculation unit 22 acquires the initial resistance value of the magnetic flux control layer at the initial use of the magnetic head stored in the initial value storage unit 28 in the storage unit 25, and calculates the resistance value change rate as the ratio of the measured resistance value to the initial resistance value (S2). The determination unit 23 determines the flying height for writing corresponding to the resistance value change rate (S3). The flying height control unit 24 controls the flying height of the magnetic head according to the information on the flying height for writing from the determination unit 23 (S4). Thereafter, the magnetic recording head of the magnetic head 10 performs the magnetic recording (S5). This operation is performed for each writing.

The resistance value measurement of the magnetic flux control layer is implemented by the head amplifier IC 11 and the MPU 14 of FIG. 1. The initial measurement value can be recorded, as a resistance value 1, in a management area on the magnetic disk or stored in the memory 17. Before the writing, the resistance value 2 of the magnetic flux control layer is measured in the same manner as the initial measurement value, and the percentage of the difference (resistance value 2/resistance value 1−1) with the resistance value 1 is calculated as the resistance value change rate (%). The flying height for writing is determined corresponding to the rate resistance value change rate, and when the flying height for writing is changed, the flying height control unit 24 changes, for example, a conduction amount of the heater to control the flying amount of the recording head. These series of operations are functions implemented by the head amplifier IC 11 and the MPU 14.

According to the first embodiment, even when the magnetic flux control layer forms an oxide due to the heat generation and the ABS of the magnetic head protrudes, the system for controlling the flying height of the magnetic head illustrated in FIGS. 10 and 11 is used to compare the resistance value of the magnetic flux control layer with the initial resistance value, determine the appropriate flying height according to the protrusion of the ABS, and increase the flying amount of the recording element unit at the time of recording, thereby making it possible to suppress the risk of contact between the magnetic head and the magnetic disk and keep the long-term reliability.

First Example

A magnetic recording head used for a first example was produced as follows.

First, layers having the following materials and thicknesses are laminated on a main magnetic pole mainly made of FeCo in the order of a first conductive layer, an adjustment layer, and a second conductive layer, respectively, by using a DC magnetron sputtering method to obtain a magnetic flux control layer 1. As the materials of the first conductive layer, the adjustment layer, and the second conductive layer, the same materials as an intermediate layer 65a, an adjustment layer 65b, and a conductive cap layer 65c of FIG. 6 were used.

A mask layer for defining a size of the magnetic flux control layer in a stripe height direction was formed, and then the magnetic flux control layer was etched by an ion beam etching (IBE) method until a main magnetic pole was exposed. SiOx of an insulating film was formed on the periphery of the magnetic flux control layer, and then the mask layer was removed. In addition, the mask layer for defining a size in a track width direction was formed and etched in the same manner, and the SiOx of the insulating film was formed around the element, thereby processing the magnetic flux control layer.

Next, NiFe was formed as a trailing shield on the conductive cap layer.

Thereafter, a Si underlayer of about 1 nm is formed on the main magnetic pole on the ABS side, the magnetic flux control layer, the trailing shield, and the insulating film by sputtering, and then diamond like carbon is formed on the Si underlayer by chemical vapor deposition to form a protective layer having a thickness of 1.6 nm, thereby obtaining a magnetic recording head. Similarly, a total of 20 magnetic recording heads having the protective layer having a thickness of 1.6 nm on the ABS side were produced.

The produced magnetic recording head was provided to produce an HDD.

As a long-term conduction test, the conduction of the magnetic flux control layer was continued for 1000 hours at an applied voltage of 200 mV under the condition that the obtained HDD is at the environmental temperature of 100° C.

The resistances before the conduction test and after the conduction test were each measured and compared by a preamp connected in the HDD.

As a result, there were cases where a value is changed with respect to an initial resistance value before the conduction test. As a result of observing the ABS by an atomic force microscope (AFM) in order to check the appearance of the magnetic head, protrusions were observed in the vicinity of the magnetic flux control layer. In addition, heads different in the resistance value change rate which is a ratio of an initial resistance value of the magnetic flux control layer and a resistance value after the conduction test were each observed by the AFM, and the results were shown in Table 1 below.

TABLE 1

| The resistance value change rate | Protrusion confirmation near magnetic flux control layer by AFM |
| --- | --- |
| 0% | Absent |
| 0.5% | Absent |
| 1.0% | Absent |
| 1.5% | Present |
| 2.0% | Present |

A protrusion was observed in the vicinity of the magnetic flux control layer in a head having a resistance value change rate of +1.5% or more. A height of the protrusion was about 0.2 nm. In order to investigate the components, the magnetic head was cut and a lateral cross section was observed by a transmission electron microscope (TEM) and element mapping, and as a result, a cross section similar to FIG. 8 was observed.

As a result of element mapping, materials used for the adjustment layer, such as Fe, Co and O, were detected at a protrusion 91. It is considered that the magnetic flux control layer 65 generates heat by the conduction to promote an oxidation reaction between oxygen flowing through pin holes of a protective film 68 and Fe and Co of the magnetic flux control layer 65. Since the volume is increased as the oxidation progresses, the spacing between the magnetic head and the magnetic disk is decreased, and the risk of contact between the magnetic head and the magnetic disk is increased. If the protective film wears due to the contact and thus the thickness of the protective film becomes thin, the number of pin holes is increased, so there arises a problem in that the oxidation reaction is further improved and the risk of contact between the magnetic head and the magnetic disk is further increased, and the long-term reliability cannot be secured.

Therefore, in Example 1, after the resistance value change rate is calculated, a flying height of the magnetic head is increased when the resistance value change rate is +1.5% or more as follows.

Figure 12:
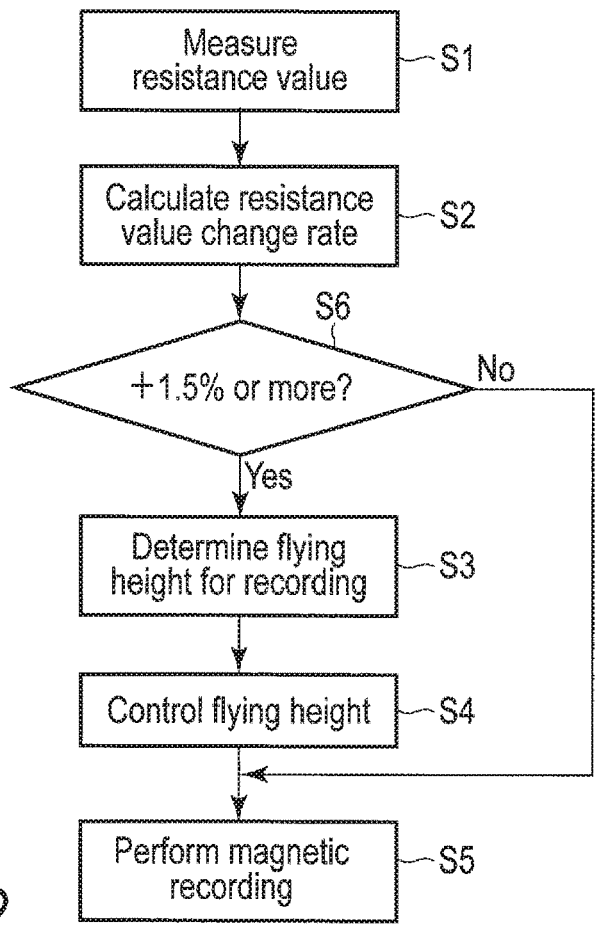
FIG. 12 is a flow chart illustrating an operation of a recording system used for the disk drive according to the first embodiment.

FIG. 12 is a flow chart illustrating an operation of a recording system used for the disk drive according to the first embodiment.

As illustrated, first, as in FIG. 11, the resistance measurement unit 21 measures the resistance value of the magnetic flux control layer 65 (S1), and the calculation unit 22 is the resistance value change rate of the measured resistance value with respect to an initial resistance value acquired from an initial value storage unit 28 in a storage unit 25 (S2). Thereafter, a judgment unit 26 judges whether the resistance value change rate is +1.5% or more (S6). As a result, when the resistance value change rate is +1.5% or more, the flying height for writing is determined corresponding to the resistance value change rate (S3), the flying height control unit 24 controls the flying height of the magnetic head based on the information on the flying height for writing from the determination unit 23 (S4), and then the recording unit of the magnetic head 10 performs the magnetic recording (S5). When the resistance value change rate is less than +1.5%, the data recording operation is performed without changing the flying height of the magnetic head (S5).

The magnetic disk apparatus equipped with the magnetic recording head provided with the magnetic flux control layer of the above configuration 1 was produced, and the recording operation was repeated according to the above flow under an acceleration condition of a temperature of 100° C. A bit error rate and the resistance value change rate of the magnetic flux control layer were measured when the conduction to the magnetic flux control layer was made for 1000 hours in total.

Figure 13:
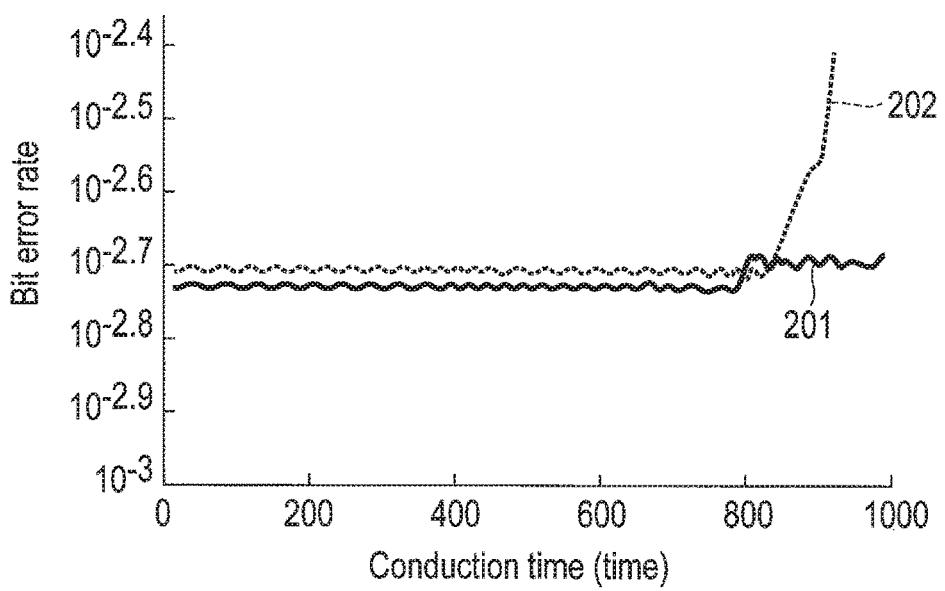
FIG. 13 is a graph illustrating a relationship between an conduction time to the magnetic flux control layer and a bit error rate in the recording operation.
Figure 14:
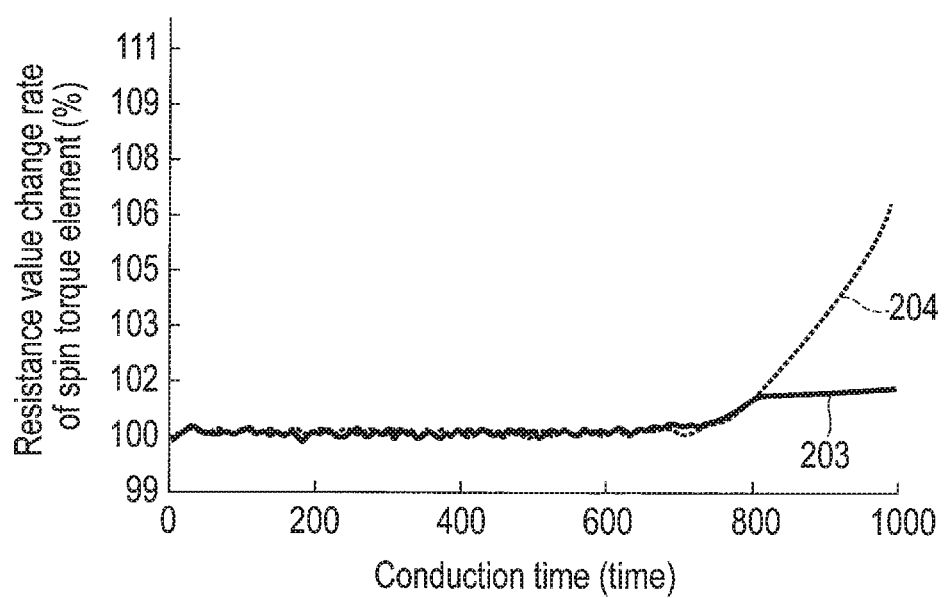
FIG. 14 is a graph illustrating a relationship between the conduction time to the magnetic flux control layer in the recording operation and a resistance value change rate.

The obtained result is illustrated in FIGS. 13 and 14.

FIG. 13 is a graph illustrating a relationship between the conduction time to the magnetic flux control layer and the bit error rate in the recording operation.

In the figure, reference numeral 201 denotes a graph of the first example, and reference numeral 202 denotes a graph in the case where the flying height of the magnetic head is not changed as a first comparative example.

FIG. 14 is a graph illustrating a relationship between the conduction time to the magnetic flux control layer and the resistance value change rate in the recording operation.

In the figure, reference numeral 203 denotes a graph of the first example, and reference numeral 204 denotes a graph in the case where the flying height of the magnetic head is not changed as the first comparative example.

As illustrated, when the conduction time was 800 hours, the resistance value change rate became 101.5% or more, so control was performed to increase the flying height of the magnetic head. Specifically, a distance between the magnetic head and the magnetic disk is increased by +0.2 nm.

In Comparative Example 1, the bit error rate significantly deteriorated in less than 1000 hours in total. On the other hand, in the first example, the flying height of the magnetic head was increased when the resistance value change rate exceeded +1.5% for 800 hours, so the bit error rate slightly deteriorated but the sufficient recording and reading characteristics can be maintained without significantly deteriorating at even 1000 hours.

In the magnetic head of the first example, when the resistance value change rate exceeded +1.5%, the distance between the magnetic head and the magnetic disk was increased by +0.2 nm. Even when the material and thickness of the magnetic flux control layer are different from those of the first example, by optimizing the distance for increasing the flying height according to the magnetic head, it is possible to maintain the sufficient recording and reading characteristics for the long-time conduction.

Figure 15:
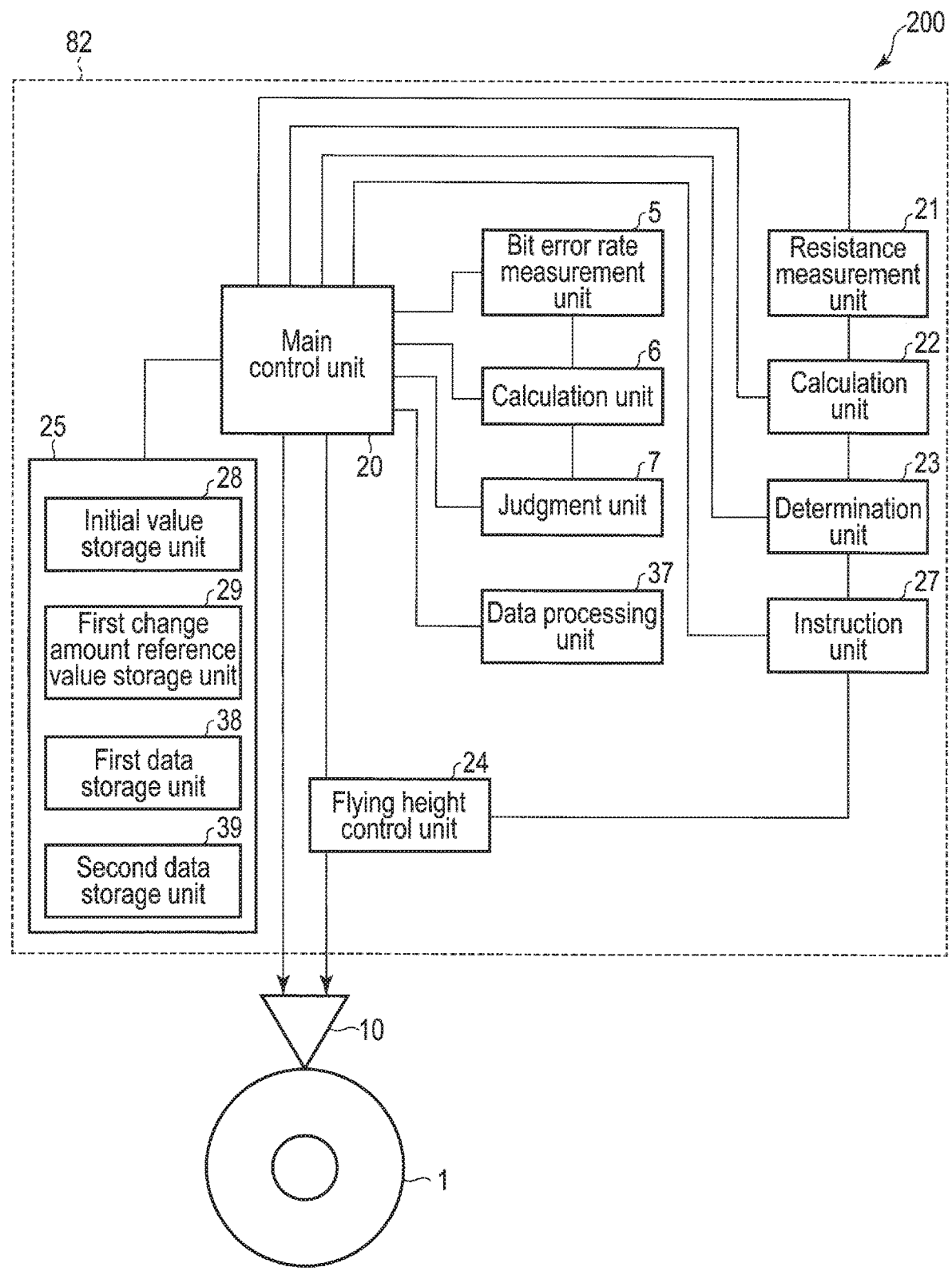
FIG. 15 is a block diagram illustrating a functional configuration of a system used for a disk drive according to a second embodiment.

FIG. 15 is a block diagram illustrating a functional configuration of a system for implementing a control of a flying height of a magnetic head in a disk drive according to a second embodiment.

A system 82 used for a disk drive 200 includes a main control unit 20 which is connected to the magnetic head 10 for performing magnetic recording on the magnetic disk 1 and controls a record/read operation of the magnetic head, a storage unit 25 which includes an initial value storage unit 28 storing an initial resistance value of a magnetic flux control layer at the time of an initial use of the magnetic head, a change amount reference value storage unit 29, a first data storage unit 38 storing a first data converting a flying height corresponding to a resistance value change rate, and a second data storage unit 39 storing a second data converting the bit error rate change amount corresponding to the flying height, a resistance measurement unit 21 which measures, as the resistance value change rate, a resistance value of the magnetic flux control layer 65, a calculation unit 22 which calculates a percentage of the resistance value of the magnetic flux control layer with respect to the initial resistance value acquired from the initial value storage unit 28, a determination unit 23 which determines a flying height for recording corresponding to the resistance value change rate, an instruction unit 27 which receives the information on the flying height for recording and instructs a flying height control unit 24 to control the flying height of the magnetic head, and a flying height control unit 24 which receives the control instruction of the flying height to control the flying height of the magnetic head.

In addition, the system 82 further includes a bit error measurement unit 5 which measures a bit error rate before and after controlling the flying height at the initial use of the magnetic head, a calculation unit 6 which calculates the measured bit error rate change amount, a judgment unit 7 which judges whether the change amount obtained by the calculation unit 6 is smaller than a first bit error rate change amount reference value acquired from the first reference value storage unit 29, and a data processing unit 37 which performs data processing such as the resistance value measured by the resistance measurement unit 21, the resistance value change rate obtained by the calculation unit 22, a bit error measurement value measured by the bit error measurement unit, and the bit error rate change amount obtained by the calculation unit 6.

FIG. 16 is a block diagram illustrating an operation of the system for controlling a flying height of a magnetic head used for the disk drive according to the second embodiment.

As shown in the system 82, first, the resistance measurement unit 21 measures the resistance value of the magnetic flux control layer before performing the recording by the magnetic head (S6). The calculation unit 22 acquires the initial resistance value of the magnetic flux control layer at the initial use of the magnetic head stored in the initial value storage unit 28 in the storage unit 25, and calculates the resistance value change ratio as the ratio of the measured resistance value with respect to the initial resistance value (S7). The determination unit 23 determines the flying height for recording corresponding to the resistance value change rate (S8).

In this system 82, a magnetic recording and reading apparatus for testing is separately prepared, a long-term conduction test (1000 hours) of the magnetic head is performed in advance at a predetermined applied voltage and environmental temperature to measure the resistance value and obtain the resistance value change rate, at that time, the flying height required to secure the reliability is determined based on, for example, the relationship between the height of the protrusion measured by an atomic force microscope (AFM) and the resistance value change rate, and the like, and the data processing unit 37 can process the relationship between the obtained resistance value change rate and flying height in a table along with the configuration of the material, the thickness and the like of the magnetic flux control layer and create a first data converting the flying height corresponding to the resistance value change rate. The first data can be stored in the first data storage unit 38. The first data can be acquired from the first data storage unit 38 as needed.

In addition, in the system 82, the bit error rate measuring unit 5 measures the bit error rate before and after controlling the flying height at the initial use of the magnetic head. The calculation unit 6 calculates the bit error rate change amount before and after controlling the flying height. For example, after measuring the bit error rate before performing the control of the flying height, the flying height is increased by 1 nm to measure the bit error rate. The bit error rate change amount with respect to 1 nm flying can be calculated based on both values.

For example, the data processing unit 37 can process the bit error rate change amount with respect to the flying height of each head based on the measurement and the calculation in the table and create the processed amount of change as a second data converting the flying height corresponding to the resistance value change rate into the bit error rate change amount. The second data can be stored in the second data storage unit 39. The second data can be acquired from the second data storage unit 39 as needed. The measurement of this amount of change can be performed at the initial use.

The data processing unit 37 can refer to the table of the first data stored in the first data storage unit to call the flying height for recording required to secure the reliability. The flying height for recording is transmitted to the determination unit 23. Subsequently, the data processing unit 37 can receive the information on the flying height for recording from the determination unit 23 and refer to the table of the second data stored in the second data storage unit to call the bit error rate change amount in the flying height required to secure the reliability. The bit error rate change amount is transmitted to the judgment unit 7.

The judgment unit 7 judges whether the bit error rate change amount is equal to or smaller than a first bit error rate change amount reference value acquired from the storage unit 29 (S9).

If the bit error rate change amount is equal to or smaller than the first bit error rate change amount reference value, the flying height control unit 24 is instructed to increase the flying height of the magnetic head, and the flying height control unit 24 increases the flying height of the magnetic head in response to the control instruction of the flying height from the instruction unit 27 (S11). Thereafter, the magnetic recording head of the magnetic head 10 performs the magnetic recording (S12). When the bit error rate change amount exceeds the first bit error rate change amount reference value, the flying height of the magnetic head is not increased because the bit error rate cannot be secured.

According to the second embodiment, the flying height is increased only when a predetermined level of bit error rate is obtained by setting the first bit error rate change amount reference value, so a contact between a flying surface of the magnetic head and the magnetic recording medium cannot only suppressed but also the sufficient bit error rate can be maintained.

The resistance value measurement of the magnetic flux control layer 65 is implemented by the head amplifier IC 11 and the MPU 14, and the measured value is recorded in the management area on the magnetic disk or stored in the memory 17 as the resistance value 1.

The measurement of the bit error rate can be obtained by writing and reading the test pattern. A series of operations are realized by the head amplifier IC 11, the R/W channel 12 and the MPU 14. The measured value of the bit error rate is recorded in the management area on the magnetic disk as the storage unit 25 or stored in the memory 17. Next, the bit error rate when the flying amount of the recording head 10 is increased is measured in the same manner, and the bit error rate change amount before and after increasing the flying height can be recorded in the management area on the magnetic disk or stored in the memory 17.

FIG. 17 is a block diagram illustrating a functional configuration of a system for implementing a control of a flying height of a magnetic head in a disk drive according to a third embodiment.

As illustrated, a system 83 used for a disk drive 300 has the same configuration as that of FIG. 15 except that a coil current control unit 19 is provided between a head 10 and a main control unit 20.

Figure 18:
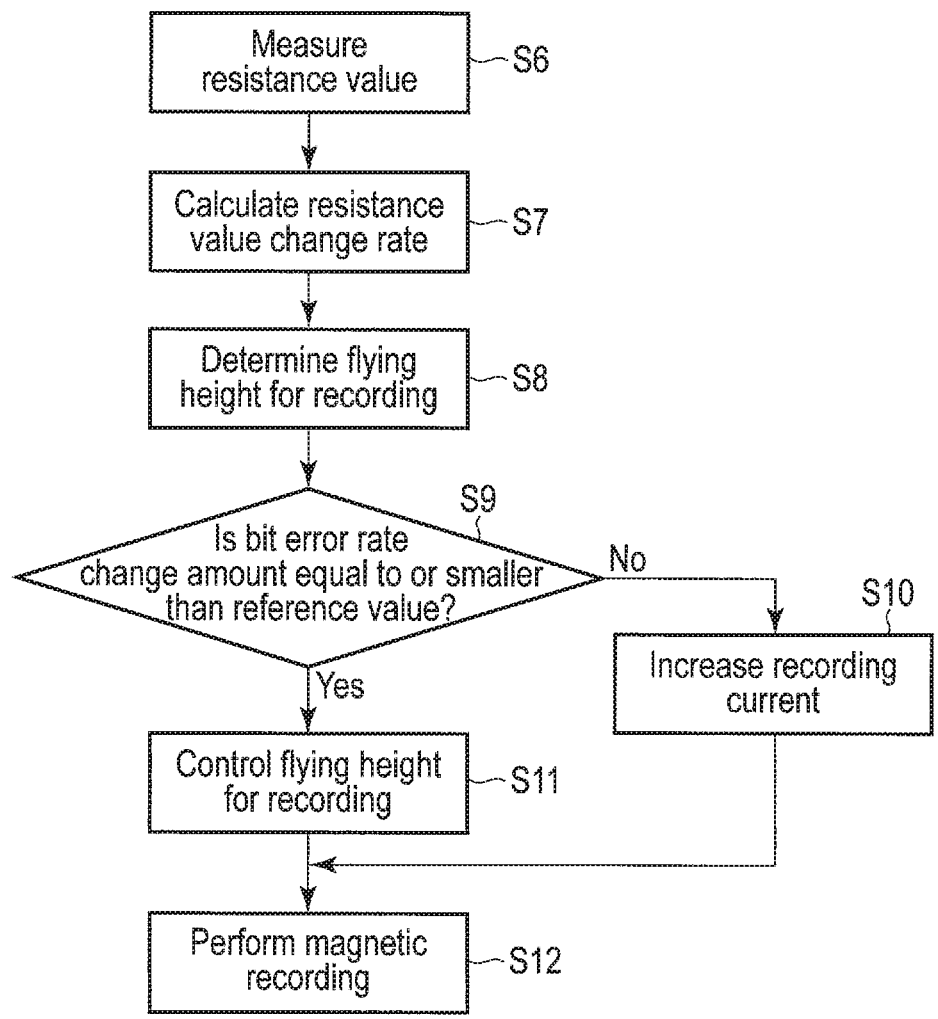
FIG. 18 is a flow chart illustrating an operation of the system used for the disk drive according to the third embodiment.

FIG. 18 is a block diagram illustrating an operation of the system for controlling a flying height of a magnetic head used for the disk drive according to the third embodiment.

As shown in this system 83, when a change amount obtained by a calculation unit 6 is greater than a first bit error rate change amount reference value, a recording current to be applied is increased (S10), and thereafter the same operation as the flow when the change amount is equal to or smaller than the first bit error rate change amount reference value is performed.

According to the third embodiment, only the increase in the flying height is performed when a predetermined level of bit error rate is obtained by setting the first bit error rate change amount reference value, and the recording current to be applied is further increased when the predetermined level of bit error rate cannot be obtained, so a contact between a flying surface of the magnetic head and the magnetic recording medium cannot only be suppressed but also the sufficient bit error rate can be maintained In the third embodiment, a second bit error rate change amount reference value greater than the first bit error rate change amount reference value is further set, and a recording operation can be stopped when the change amount obtained by the calculation unit 6 is equal to or greater than the second bit error rate change amount reference value.

Figure 19:
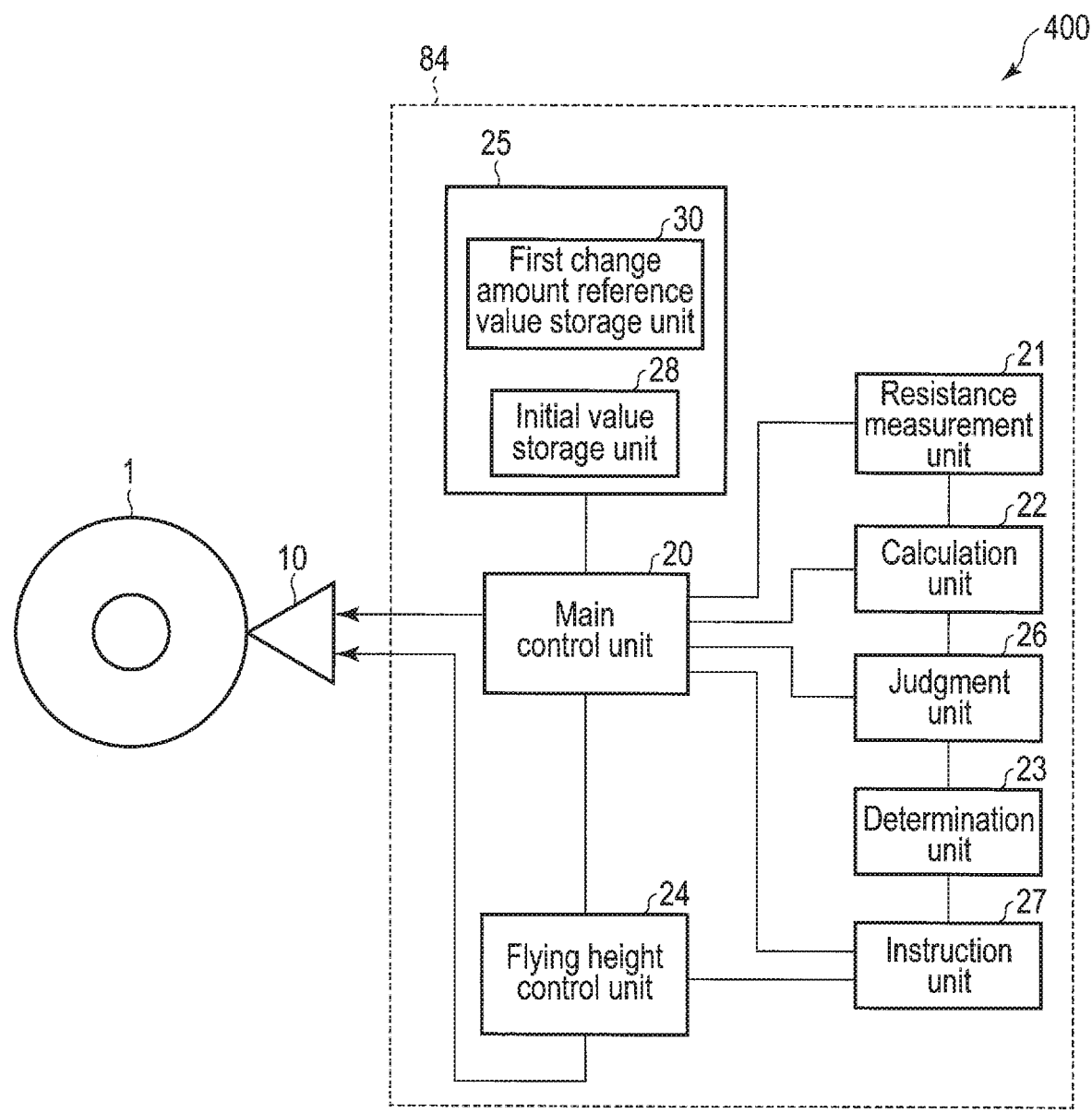
FIG. 19 is a block diagram illustrating a functional configuration of a system for controlling a flying height of a magnetic head used for a disk drive according to a fourth embodiment.

FIG. 19 is a block diagram illustrating a functional configuration of a system for implementing a control of a flying height of a magnetic head according to a fourth embodiment.

As illustrated, a system 84 used for a disk drive 400 has the similar configuration to that of FIG. 10. However a storage unit 25 further includes a first change rate reference value storage unit 30 in which the first resistance value change rate reference value is set and stored. Additionally, the system 84 further includes a judgment unit 26 which judges whether a resistance value change rate is equal to or greater than the first resistance value change rate reference value between a calculation unit 22 and a determination unit 23 and further includes an instruction unit 27 between the determination unit 23 and a flying height control unit 24 which issues an instruction to increase a flying height for recording to the flying height control unit 24 in the system 84.

FIG. 20 is a flowchart illustrating an operation of the system for controlling a flying height of a magnetic head used for the disk drive according to the fourth embodiment.

As shown in the system 84, first, a resistance measurement unit 21 measures a resistance value of a magnetic flux control layer before performing the recording by the magnetic head (S26). The calculation unit 22 acquires an initial resistance value of the magnetic flux control layer at the initial use of the magnetic head stored in an initial value storage unit 28 in the storage unit 25, and calculates the resistance value change rate of the magnetic flux control layer with respect to the initial resistance value (S27). The judgment unit 26 judges whether the resistance value change rate is greater than the first resistance value change rate reference value (S28). As a result, when the resistance value change rate is greater than the first resistance value change rate reference value, the determination unit 23 determines the flying height for recording corresponding to the resistance value change rate (S29). The instruction unit 27 receives the information on the flying height for recording and instructs the flying height control unit 24 to control the flying height, and the flying height control unit 24 responds to the flying height control instruction from the instruction unit 27 to control the flying height of the magnetic head (S30). Thereafter, the magnetic recording head of the magnetic head 10 performs the magnetic recording (S31).

When the flying height is increased, a bit error rate is reduced accordingly, so it is preferable not to increase the flying height as much as possible. In the system for controlling a flying height of a magnetic head used in the fourth embodiment, if the change rate calculated from the resistance value measured before the recording is equal to or smaller than the first resistance value change rate reference value, it is considered that there is no problem with the bit error rate and thus the flying height is not changed, so there is no need to increase the unnecessary flying height.

Figure 21:
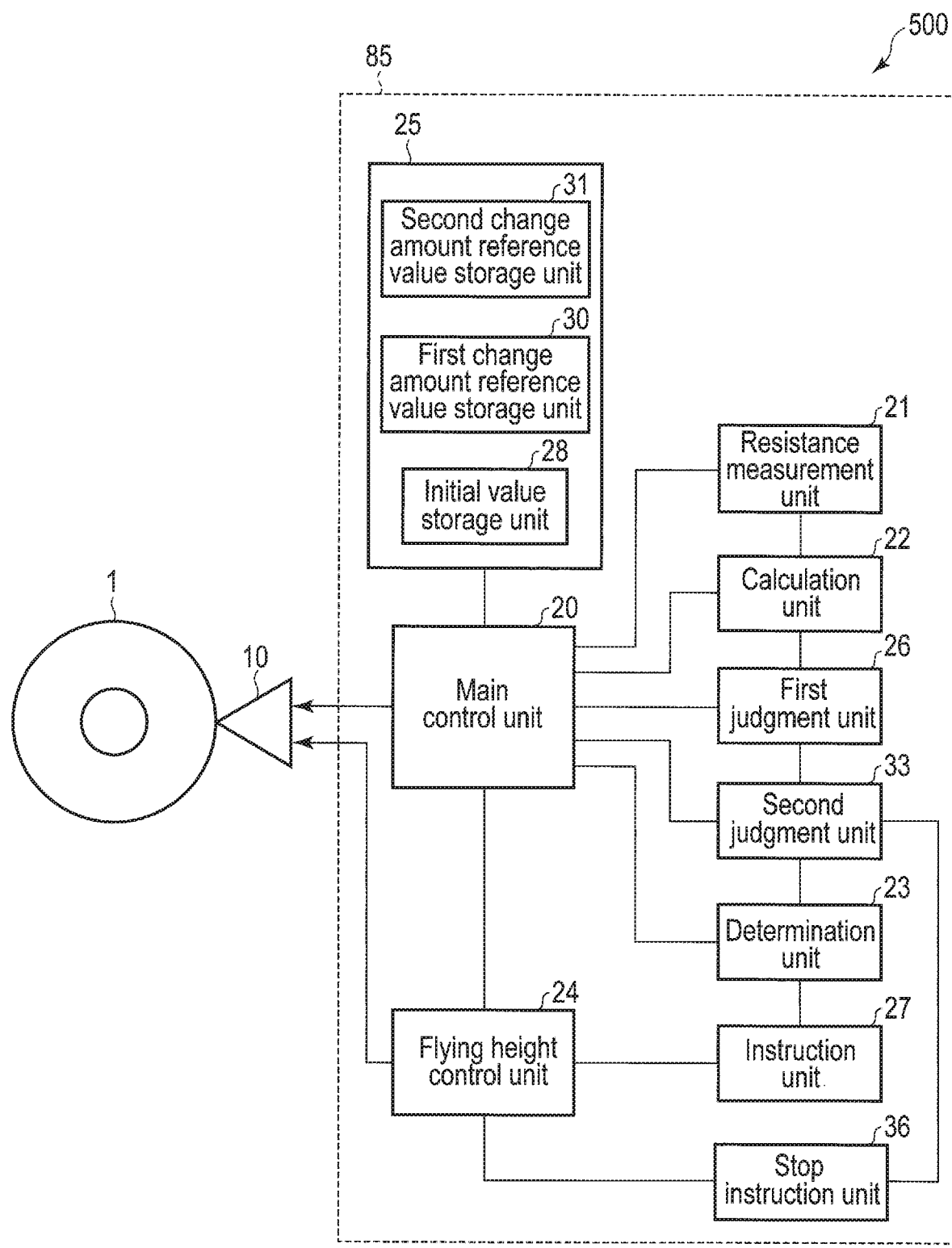
FIG. 21 is a block diagram illustrating a functional configuration of a system for controlling a flying height of a magnetic head used for a disk drive according to a fifth embodiment.

FIG. 21 is a block diagram illustrating a functional configuration of a system for implementing a control of a flying height of a magnetic head in a disk drive according to a fifth embodiment.

As illustrated, a system 85 used for a disk drive 500 has the similar configuration to that of FIG. 10. However the system 85 further includes a first resistance value change rate reference value storage unit 30 which sets and stores a first resistance value change rate reference value, a first resistance value change rate reference value storage unit 31 which sets and stores a second resistance value change rate reference value greater than the first resistance value change rate reference value. Additionally, the system 85 further includes a first judgment unit 26 between a calculation unit 22 and a determination unit 23 which judges whether the measured resistance value is equal to or greater than the first resistance value change rate reference value, a second judgment unit 33 which judges whether the measured resistance value is equal to or smaller than the second resistance value change rate reference value. Furthermore, the system 85 further includes an instruction unit 27 between the determination unit 23 and a flying height control unit 24 which issues an instruction to control the flying height to the flying height control unit 24, and a stop instruction unit 36 which issues an instruction to stop a recording operation to a main control unit 20.

The second resistance value change rate reference value is greater than the first resistance value change rate reference value.

Figure 22:
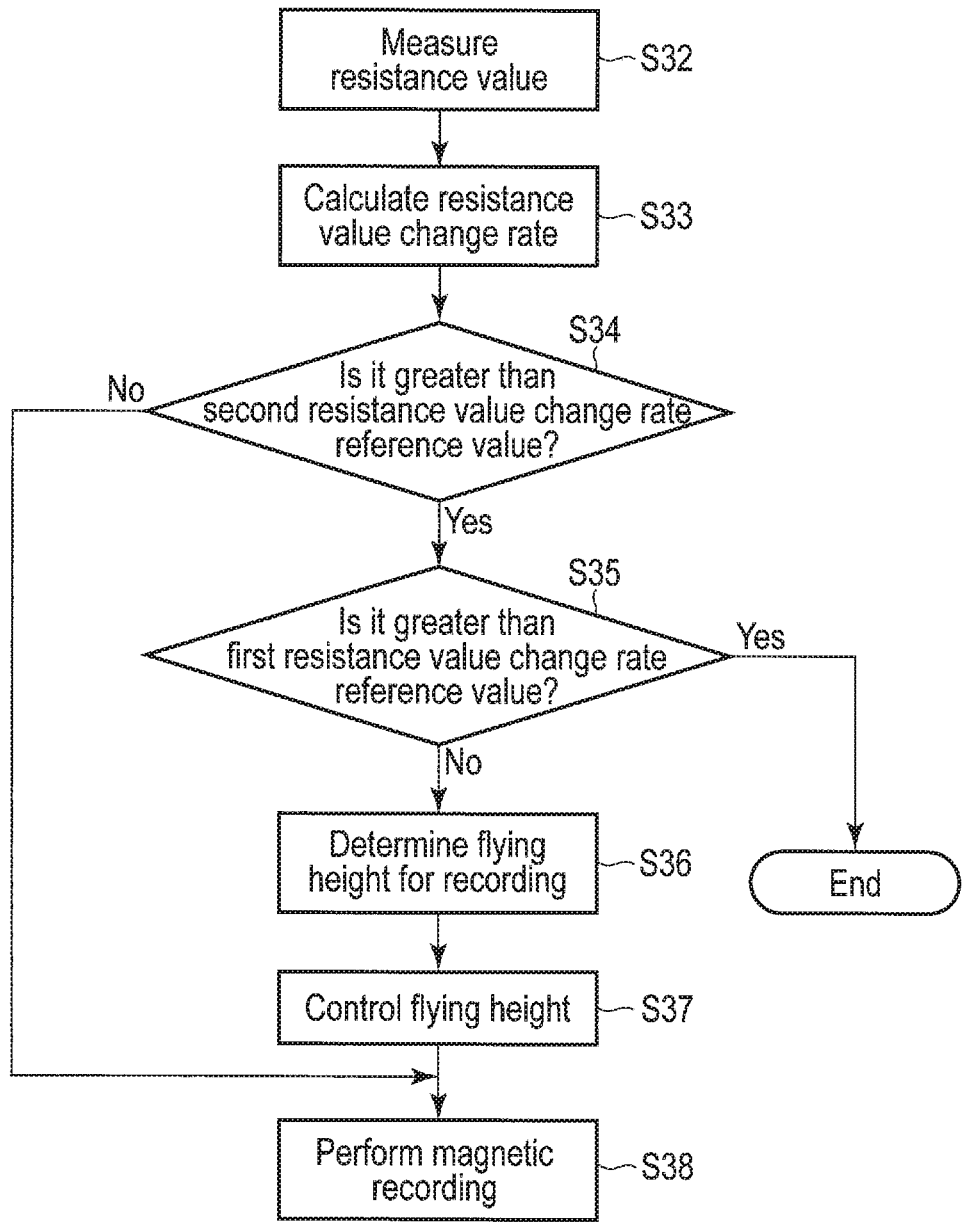
FIG. 22 is a flow chart illustrating an operation of the system for controlling a flying height of the magnetic head used for the disk drive according to the fifth embodiment.

FIG. 22 is a flowchart illustrating an operation of the system for controlling a flying height of a magnetic head used for the disk drive according to the fifth embodiment.

As shown in the system 85, first, a resistance measurement unit 21 measures a resistance value of a magnetic flux control layer before performing the writing by the magnetic head (S32). The calculation unit 22 acquires an initial resistance value of the magnetic flux control layer at the initial use of the magnetic head stored in an initial value storage unit 28 in the storage unit 25, and calculates the resistance value change rate of the magnetic flux control layer with respect to the initial resistance value (S33). The first judgment unit 26 determines whether the resistance value change rate is greater than the first resistance value change rate reference value acquired from the first change rate reference value storage unit 30 (S34). As a result, when the resistance value change rate is equal to or smaller than the first resistance value change rate reference value, the magnetic recording is performed without changing the flying height for writing (S38). When the resistance value change rate is greater than the first resistance value change rate reference value, the second judgment unit 33 judges whether the resistance value change rate is equal to or smaller than the second resistance value change rate reference value (S35). When the resistance value change rate is equal to or smaller than the second resistance value change rate reference value, the determination unit 23 determines the flying height for writing corresponding to the resistance value change rate (S36). The instruction unit 27 instructs the flying height control unit 24 to control the flying height based on the information on the flying height for recording from the determination unit 23. The flying height control unit 24 controls the flying height of the magnetic head according to the instruction of the flying height for recording from the instruction unit 27 (S37). Thereafter, the magnetic recording head of the magnetic head 10 performs the magnetic recording (S31). In addition, when the resistance value change rate exceeds the second resistance value change rate reference value, the stop instruction unit 36 instructs the main control unit 20 to stop the recording.

In the fifth embodiment, the resistance value 2 of the magnetic flux control layer 65 is measured in the same manner as the initial resistance value before the recording, and the percentage of the ratio (resistance value 2/resistance value 1) to the resistance value 1 as the initial measurement value is calculated as the resistance value change rate. When the resistance value change rate is greater than the first resistance value change rate reference value, a flying sensitivity amount of the bit error rate stored is referred, and when the resistance value change rate is smaller than a reference flying sensitivity amount, a heater conduction amount is changed to control the flying amount of the recording head. These series of operations are functions implemented by the head amplifier IC 11 and the MPU 14.

According to the fifth embodiment, first, if the change rate calculated from the resistance value measured before the recording is equal to or smaller than the first resistance value change rate reference value, it is considered that there is no problem with the bit error rate and thus the flying height is not changed, so there is no need to increase the unnecessary flying height.

In addition, when the change rate calculated from the resistance value measured before the recording is greater than the second resistance value change rate reference value, the sufficient bit error rate cannot be obtained even if the flying height is increased, so the replacement of the magnetic head and the like is required. Therefore, the recording operation can be stopped.

In the fourth and fifth embodiments, as in the second and third embodiments, the first bit error rate change amount reference value is stored in the storage unit, and the bit error rate measurement unit, the calculation unit which calculates the first bit error rate change amount, and the judgment unit which judges whether the first bit error rate change amount is equal to or smaller than the first bit error rate change amount reference value are further provided, and a recording current to be applied can be further increased when the first bit error rate change amount exceeds the first bit error rate change amount reference value.

A disk drive according to a sixth embodiment is a modification of a configuration near ABS of a magnetic head.

FIG. 23 is an enlarged cross-sectional view of an ABS side end portion of a recording head, which is used for the disk drive according to the sixth embodiment, taken along a track center.

As illustrated, a recording head 158 includes a main magnetic pole 160 made of a high saturation magnetization material which generates a recording magnetic field perpendicular to the surface of the magnetic disk 1, a trailing shield 162, and a magnetic flux control layer 165 provided between the main magnetic pole 160 and the trailing shield 162.

The main magnetic pole 160 extends substantially perpendicularly to an ABS 143. A tip portion 160a on a magnetic disk 116 side of the main magnetic pole 160 is tapered toward the disk surface. The tip portion 160a of the main magnetic pole 160 has, for example, a trapezoidal cross section. A tip surface of the main magnetic pole 160 is exposed to the ABS 143 of a slider 140. A width of a trailing side end face 160b of the tip portion 160a substantially corresponds to a track width in the magnetic disk 1.

The tip portion 162a of the trailing shield 162 is formed in an elongated rectangular shape. A tip surface of the trailing shield 162 is exposed to the ABS 143. A leading side end face 162b of the tip portion 162a extends along the track width direction of the magnetic disk 1 and also substantially vertically extends with respect to the ABS 143. The leading side end face 162b faces the trailing side end face 160b of the main magnetic pole 160 in parallel at a write gap WG.

The magnetic flux control layer 165 is provided between the tip portion 160a of the main magnetic pole 160 and the tip portion 162a of the trailing shield 162 in the write gap WG.

The magnetic flux control layer 165 includes an intermediate layer (first nonmagnetic conductive layer) 165a having conductivity, an adjustment layer 165b, and a conductive cap layer (second nonmagnetic conductive layer) 165c having conductivity, and these layers are configured by being sequentially laminated from the main magnetic pole 160 side toward the trailing shield 162 side, that is, sequentially laminated along a traveling direction D of the magnetic head. The intermediate layer 165a is bonded to the trailing side end face 160b of the main magnetic pole 160 via a nonmagnetic conductive layer (underlayer) 167a. The conductive cap layer 165c is bonded to the leading side end face 162b of the trailing shield 162 via the nonmagnetic conductive layer (cap layer) 167b. The laminated order of the intermediate layer 165a, the adjustment layer 165b, and the conductive cap layer 165c may be in a reverse order to the above, that is, may be sequentially laminated from the trailing shield 162 side toward the main magnetic pole 160 side.

The intermediate layer 165a, the adjustment layer 165b, and the conductive cap layer 165c each have a lamination surface or a film surface extending in a direction intersecting with the ABS 143, for example, in a direction orthogonal thereto. At least a lower end face of the oscillation layer 165c, in the present embodiment, the entire lower end face of the STO 165 including the intermediate layer 165a, the adjustment layer 165b, and the conductive cap layer 165c retreats by a distance (retreat amount) rh in a direction away from the ABS 143, for example, in a direction perpendicular to the ABS 143, and toward a back side, that is, positioned to be spaced part from each other. That is, the lower end face of the STO 165 is provided to be spaced apart from an air bearing surface 143 by the distance (retreat amount) rh from the main magnetic pole 160 and the trailing shield 162.

The disk drive according to the sixth embodiment has the same configurations as FIGS. 1, 2, and 3 except that as shown in FIG. 23, a recording head 158 which includes a tip portion 160a of a main magnetic pole, a tip portion 162a of a trailing shield, and a magnetic flux control layer 165 provided between the tip portion 160a of the main magnetic pole and the tip portion 162a of the trailing shield are provided, instead of the recording head 58 which includes the tip portion 60a of the main magnetic pole 60, the tip portion 62a of the trailing shield 62, and the magnetic flux control layer 65 provided between the tip portion 60a of the main magnetic pole and the tip portion 62a of the trailing shield as shown in FIG. 5 for example.

In the disk drive according to the sixth embodiment, since the distance from the magnetic disk is increased by the amount by which the magnetic flux control layer of the magnetic head retreats in a direction away from the ABS, even if the oxide of the magnetic element of the magnetic flux control layer is precipitated near the ABS to cause the deformation, there is the effect of making it difficult to contact the magnetic disk. In FIG. 23, although the intermediate layer 165a, the adjustment layer 165b, and the conductive cap layer 165c are all retracted, the effect of the sixth embodiment is obtained if the adjustment layer 165b including at least the magnetic material retreats.

The write gap WG of the disk drive according to the sixth embodiment can be set to be 30 nm or less, and when the write gap WG exceeds 30 nm, the recording magnetic field gradient is insufficient, so there is a tendency that the desired recording linear density cannot be secured. The retreat amount rh can be 1 nm or greater. If the retreat amount rh is less than 1 nm, there is a risk that the dispersion of the gap magnetic field may be large, and the reversal or simultaneous rotation of the magnetization of the magnetic flux control layer may be insufficient. The retreat amount rh can also be equal to or smaller than 9 nm. If the retreat amount rh exceeds 9 nm, the magnetic field leaking from the main magnetic pole 60 to the write gap WG is increased, and the convergence of the magnetic flux toward the magnetic recording layer 103 of the magnetic disk 1 tends to deteriorate.

The disk drive according to the sixth embodiment can be used in combination with any of the systems for controlling a flying height of the magnetic head used in the second to fifth embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic recording and reading apparatus, comprising:
  a rotatable disk-shaped recording medium which comprises a magnetic recording layer;
  a magnetic head which records information on the recording medium; and
  a system which controls a flying height of the magnetic head,
  wherein the magnetic head comprises:
  an air bearing surface;
  a main magnetic pole which comprises a tip portion extending up to the air bearing surface and generates a recording magnetic field in a vertical direction;
  an auxiliary magnetic pole which faces the tip portion of the main magnetic pole at a write gap and configures a magnetic core along with the main magnetic pole;
  a coil which magnetizes the main magnetic pole and the auxiliary magnetic pole;
  a magnetic flux control layer which comprises a first conductive layer provided on the main magnetic pole, an adjustment layer laminated on the first conductive layer, and made of a magnetic material including at least one of iron, cobalt, or nickel, and a second conductive layer electrically connecting between the adjustment layer and the auxiliary magnetic pole; and a protective layer which is provided on the main magnetic pole, the magnetic flux control layer, and the air bearing surface of the auxiliary magnetic pole, and the system which controls the flying height of the magnetic head comprises:

a main control unit which controls a recording/reading operation of the magnetic head;

a storage unit which comprises an initial storage unit storing an initial resistance value of the magnetic flux control layer at an initial use of the magnetic head;

a resistance measurement unit which measures a resistance value of the magnetic flux control layer;

a calculation unit which acquires the initial resistance value from the initial value storage unit and calculates a ratio of the resistance value of the magnetic flux control layer with respect to the initial resistance value as a resistance value change rate;

a determination unit which determines a flying height for recording corresponding to the resistance value change rate; and a flying height control unit which receives the information on the flying height for recording to control the flying height of the magnetic head.

2. The magnetic recording and reading apparatus according to claim 1, wherein the flying height control unit increases the flying height for recording.

3. The magnetic recording and reading apparatus according to claim 1, wherein the storage unit further comprises a first data storage unit which stores a first data converting the flying height based on the resistance value change rate, a second data storage unit which stores a second data converting a bit error rate change amount corresponding to the flying height, and a change amount reference value storage unit which stores a bit error rate change amount reference value, the system which controls the flying height of the magnetic head further comprises:

a data processing unit which obtains the resistance value change rate, the flying height for recording, and the bit error rate change amount from the resistance value measured by the resistance measurement unit based on the first data and the second data acquired from the storage unit; and a bit error rate change amount judgment unit which judges whether the bit error rate change amount is smaller than the bit error rate change amount reference value.

4. The magnetic recording and reading apparatus according to claim 3, further comprising: a coil current control unit which increases a recording current to be applied to a coil if the bit error rate change amount judgment unit determines that the bit error rate change amount is equal to or greater than the change amount reference value.

5. The magnetic recording and reading apparatus according to claim 1, wherein the storage unit further comprises a change rate reference value storage unit which stores a first resistance value change rate reference value, the magnetic recording and reading apparatus further comprises a judgment unit which judges whether the resistance value change rate obtained from the measured resistance value is greater than a resistance value change rate reference value, prior to the determination unit, and the determination unit determines the flying height for recording when the resistance value change rate obtained from the measured resistance value is greater than the resistance value change rate reference value.

6. The magnetic recording and reading apparatus according to claim 5, wherein the storage unit further stores a second resistance value change rate reference value greater than the first resistance value change rate reference value, the judgment unit judges whether the resistance value change rate exceeds the second resistance value change rate reference value, and the magnetic recording and recording apparatus further comprises a stop instruction unit which instructs the main control unit to stop an operation of the magnetic head when the judgment unit judges that the resistance value change rate exceeds the second resistance value change rate reference value.

7. The magnetic recording and reading apparatus according to claim 5, wherein the storage unit further comprises a first data storage unit which stores a first data converting the flying height corresponding to the resistance value change rate, a second data storage unit which stores a second data converting a bit error rate change amount based on the flying height, and a change amount reference value storage unit which stores a bit error rate change amount reference value, and the system for controlling a flying height of a magnetic head further comprises a data processing unit which obtains the resistance value change rate, the flying height for recording, and the bit error rate change amount from the resistance value measured by the resistance measurement unit based on the first data and the second data acquired from the storage unit and a bit error rate change amount judgment unit which judges whether the bit error rate change amount is smaller than the bit error rate change amount reference value.

8. The magnetic recording and reading apparatus according to claim 1, wherein the resistance measurement unit measures the resistance value twice or more, and the determination unit determines the flying height for recording based on the resistance value change rate equal to or greater than 2.

9. The magnetic recording and reading apparatus according to claim 8, wherein the resistance measurement unit measures the resistance value every predetermined time.

10. The magnetic recording and reading apparatus according to claim 1, wherein at least the adjustment layer of the magnetic flux control layer retreats in a direction away from the air bearing surface with respect to the main magnetic pole and the auxiliary magnetic pole.

11. The magnetic recording and reading apparatus according to claim 10, wherein the write gap is formed to 30 nm or less, and the adjustment layer is spaced apart from the air bearing surface by 1 nm or more.

12. A magnetic recording method performing magnetic recording while conducting a current to a magnetic flux control layer using a magnetic head which comprises a main magnetic pole, an auxiliary magnetic pole, a first conductive layer provided between the main magnetic pole and the auxiliary magnetic pole and formed on the main magnetic pole, an adjustment layer made of a magnetic material including at least one of iron, cobalt, or nickel, and a second conductive layer electrically connecting between the adjustment layer and the auxiliary magnetic pole, the magnetic recording method comprising:

measuring a resistance value of the magnetic flux control layer;

calculating a resistance value change rate as a ratio of the resistance value of the magnetic flux control layer with respect to an initial resistance value of the magnetic flux control layer measured at an initial use of the magnetic head;

determining a flying height for recording corresponding to the resistance value change rate;

controlling a flying height of the magnetic head by receiving information on the flying height for recording; and performing the magnetic recording on a magnetic recording layer using the magnetic head whose flying height is controlled.

13. The magnetic recording method according to claim 12, wherein the controlling of the flying height of the magnetic head is to increase the flying height of the magnetic head.

14. The magnetic recording method according to claim 12, further comprising:

creating a first data converting the flying height for recording corresponding to the resistance value change rate by measuring the flying height and a resistance value in advance;

creating a second data converting a bit error rate change amount corresponding to the flying height by measuring the flying height and a bit error rate in advance;

setting the bit error rate change amount reference value in advance;

obtaining the resistance value change rate, the flying height for recording, and the bit error rate change amount by performing data processing on a resistance value measured by the resistance measurement unit based on the first data and the second data; and determining whether the bit error rate change amount is smaller than the change amount reference value.

15. The magnetic recording method according to claim 14, further comprising: increasing a recording current to be applied to the coil if it is determined that the bit error rate change amount exceeds the change amount reference value.

16. The magnetic recording method according to claim 12, further comprising:

determining whether the resistance value change rate exceeds a first resistance value change rate reference value by setting the first resistance value change rate reference value; and issuing an instruction to a flying height control unit to increase the flying height for recording if it is determined that the resistance value change rate does not exceed the first resistance value change rate reference value.

17. The magnetic recording method according to claim 16, further comprising:

setting, by the storage unit, a second resistance value change rate reference value greater than the first resistance value change rate reference value and determining whether the resistance value change rate exceeds the second resistance value change rate reference value, and instructing, by a stop instruction unit, the main control unit to stop an operation of the magnetic head if it is determined that the resistance value change rate exceeds the second resistance value change rate reference value.

18. The magnetic recording method according to claim 16, further comprising:

creating a first data converting the flying height for recording corresponding to the resistance value change rate by measuring the flying height and a resistance value in advance;

creating a second data converting a bit error rate change amount corresponding to the flying height by measuring the flying height and a bit error rate in advance;

setting the bit error rate change amount reference value in advance;

obtaining the resistance value change rate, the flying height for recording, and the bit error rate change amount by performing data processing on a resistance value measured by the resistance measurement unit based on the first data and the second data; and determining whether the bit error rate change amount is smaller than the change amount reference value.

19. The magnetic recording method according to claim 12, wherein the resistance value is measured twice or more, and the determination unit determines the flying height for recording based on the resistance value change rate equal to or greater than 2.

20. The magnetic recording method according to claim 19, wherein the resistance value is measured every predetermined time.

* * * * *